United States Patent
Zur et al.

(10) Patent No.: US 8,417,834 B2
(45) Date of Patent: Apr. 9, 2013

(54) UNIFIED INFRASTRUCTURE OVER ETHERNET

(75) Inventors: Uri El Zur, Irvine, CA (US); Kan Frankie Fan, Diamond Bar, CA (US); Scott S. McDaniel, Villa Park, CA (US); Murali Rajagopal, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1266 days.

(21) Appl. No.: 11/007,063

(22) Filed: Dec. 8, 2004

(65) Prior Publication Data
US 2005/0120141 A1 Jun. 2, 2005

Related U.S. Application Data

(63) Continuation-in-part of application No. 10/938,156, filed on Sep. 10, 2004.

(60) Provisional application No. 60/501,794, filed on Sep. 10, 2003, provisional application No. 60/507,638, filed on Oct. 1, 2003, provisional application No. 60/527,739, filed on Dec. 8, 2003.

(51) Int. Cl.
*G06F 15/16* (2006.01)
(52) U.S. Cl.
USPC .......................................... 709/249; 370/466
(58) Field of Classification Search .................. 709/249; 370/466
See application file for complete search history.

(56) References Cited

U.S. PATENT DOCUMENTS

| | | | |
|---|---|---|---|
| 6,131,163 A * | 10/2000 | Wiegel | 726/12 |
| 6,400,730 B1 * | 6/2002 | Latif et al. | 370/466 |
| 6,636,503 B1 * | 10/2003 | Shiran et al. | 370/352 |
| 6,704,798 B1 * | 3/2004 | Mogul | 709/246 |
| 6,741,566 B1 * | 5/2004 | Furlong et al. | 370/236 |
| 6,983,303 B2 * | 1/2006 | Pellegrino et al. | 709/203 |
| 7,032,037 B2 * | 4/2006 | Garnett et al. | 710/2 |
| 7,113,487 B1 * | 9/2006 | Johnson et al. | 370/255 |
| 7,152,160 B2 * | 12/2006 | Lantto et al. | 713/168 |
| 7,213,077 B2 * | 5/2007 | Border | 709/234 |

(Continued)

FOREIGN PATENT DOCUMENTS
EP 1206099 A 5/2002

OTHER PUBLICATIONS

Clark T, IP SANs, A Guide to iSCSI, iFCP and FCIP Protocols for Storage Area Networks, 2002, Pearson Education, USA, XP002356300, Ch. 3 and Ch. 8.

(Continued)

*Primary Examiner* — David Lazaro
*Assistant Examiner* — Waseem Ashraf
(74) *Attorney, Agent, or Firm* — Thomas | Horstemeyer, LLP

(57) ABSTRACT

Systems and methods that provide a unified infrastructure over Ethernet are provided. In one embodiment, a method of communicating between an Ethernet-based system and a non-Ethernet-based network may include, for example, one or more of the following: generating an Ethernet frame that comprises a proxy payload, a proxy association header and an Ethernet header, the Ethernet header relating to a control proxy element; sending the Ethernet frame over an Ethernet-based network to the control proxy element; generating a non-Ethernet frame that comprises the proxy payload and a proxy header; and sending the non-Ethernet frame over a non-Ethernet-based network.

80 Claims, 31 Drawing Sheets

U.S. PATENT DOCUMENTS

| | | | |
|---|---|---|---|
| 7,600,222 B2 * | 10/2009 | Wilt et al. | 717/146 |
| 2002/0059425 A1 * | 5/2002 | Belfiore et al. | 709/226 |
| 2002/0112076 A1 * | 8/2002 | Rueda et al. | 709/245 |
| 2003/0005279 A1 * | 1/2003 | Valenci et al. | 713/150 |
| 2003/0051057 A1 * | 3/2003 | Garnett et al. | 709/249 |
| 2003/0065864 A1 * | 4/2003 | Hollinger | 710/305 |
| 2003/0217183 A1 * | 11/2003 | Rimmer et al. | 709/249 |
| 2004/0024833 A1 * | 2/2004 | Siddabathuni | 709/212 |

OTHER PUBLICATIONS

International Preliminary Report on Patentability corresponding to International Application Serial No. PCT/US2004/041100, mailed Jul. 17, 2008, 9 pages.

* cited by examiner

| Method | Control Proxy Location | End-Point Capability | Control Proxy Capability |
|---|---|---|---|
| 1 | Switch | SCSI-3 | FCP, FC-2, other |
| 2 | Switch | SCSI-3, FCP | FC-2, other |
| 3 | Switch | SCSI-3, FCP, FC-2 | Other |
| 4 | Shared Blade Server | SCSI-3 | FCP, FC-2, other |
| 5 | Shared Blade Server | SCSI-3, FCP | FC-2, other |
| 6 | Shared Blade Server | SCSI-3, FCP, FC-2 | Other |

Note: Control Proxy "Other" capability can range, for example, from running name, discovery, management services to common security services

FIG. 16

| Byte 0 | Byte 1 | Byte 2 | Byte 3 |
|--------|--------|--------|--------|
| R_CTL | D_ID | | |
| CS_CTL | S_ID | | |
| TYPE | F_CTL | | |
| SEQ_ID | DF_CTL | SEQ_CNT | |
| OX_ID | | RX_ID | |
| PARM | | | |

FIG. 31

UNIFIED INFRASTRUCTURE OVER ETHERNET

CROSS REFERENCE TO RELATED APPLICATIONS

This application is a continuation-in-part of co-pending U.S. patent application Ser. No. 10/938,156, entitled "System and Method for Load Balancing and Fail Over" and filed on Sep. 10, 2004. Said U.S. patent application Ser. No. 10/938, 156 makes reference to, claims priority to and claims benefit from U.S. Provisional Patent Application Ser. No. 60/501, 794, entitled "System and Method for Load Balancing and Fail Over" and filed on Sep. 10, 2003 and U.S. Provisional Patent Application Ser. No. 60/507,638, entitled "System and Method for Load Balancing and Fail Over" and filed on Oct. 1, 2003.

This application makes reference to, claims priority to and claims benefit from U.S. Provisional Patent Application Ser. No. 60/527,739, entitled "Unified Infrastructure over Ethernet" and filed on Dec. 8, 2003.

INCORPORATION BY REFERENCE

The above-referenced United States patent applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In peer-to-peer communications over multiple fabrics it is inefficient to have a separate dedicated switch for each traffic type (e.g., storage traffic, transport/network traffic, cluster traffic, etc.). Furthermore, if multiple fabrics are present between two peers, then both peers must be aware of all the different fabrics between the two peers as well as know the various fabric protocols. Adaptations to each peer to accommodate additional protocols or additional communication partners can be particularly expensive when the peers are great distances apart.

A computer (e.g., a server) can be attached to many fabrics to access different services or data. These computers can be grouped (e.g., server blades) to reduce foot print, cooling requirements, management concerns, etc. As many of the computers of the group need to access the same resource or service, it is desired to be more efficient and to allow further shrinking of the server input/output (I/O) subsystem if access to the remote service/resource is also grouped.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in, for example, systems and methods that a unified network over, for example, Ethernet.

In one embodiment according to some aspects of the present invention, a method of communicating between an Ethernet-based system and a non-Ethernet-based network may include, for example, one or more of the following: generating an Ethernet frame that comprises a proxy payload, a proxy association header and an Ethernet header, the Ethernet header relating to a control proxy element; sending the Ethernet frame over an Ethernet-based network to the control proxy element; generating a non-Ethernet frame that comprises the proxy payload and a proxy header; and sending the non-Ethernet frame over a non-Ethernet-based network.

In another embodiment according to some aspects of the present invention, a method of communicating between an Ethernet-based system and a non-Ethernet-based network may include, for example, one or more of the following: receiving, over a non-Ethernet-based network, a non-Ethernet frame that comprises a proxy header, a proxy footer and a proxy payload; generating an Ethernet frame that comprises an Ethernet header, a proxy association header and the proxy payload, the Ethernet header relating to an end point; and sending the Ethernet frame over an Ethernet-based network to the end point.

In another embodiment according to some aspects of the present invention, a method of communicating between an Ethernet-based system and a non-Ethernet-based network may include, for example, one or more of the following: generating an Ethernet frame that comprises a non-Ethernet frame, a proxy association header and an Ethernet header, the Ethernet header relating to a control proxy element; sending the Ethernet frame over an Ethernet-based network to the control proxy element; and sending the non-Ethernet frame over a non-Ethernet-based network.

In another embodiment according to some aspects of the present invention, a system that provides communication between an Ethernet-based system and a non-Ethernet-based system includes, for example, an end point and a control proxy element. The end point may be adapted, for example, to generate an Ethernet frame that includes, for example, a proxy payload, a proxy association header and an Ethernet header. The Ethernet header may relate to, for example, a control proxy element. The control proxy element may be coupled to the end point via an Ethernet-based network. The control proxy element may receive the generated Ethernet frame over the Ethernet-based network and may generate a non-Ethernet frame that includes the proxy payload and a proxy header. The control proxy element may send the non-Ethernet frame over a non-Ethernet-based network.

In another embodiment according to some aspects of the present invention, a system that provides communication between an Ethernet-based system and a non-Ethernet-based system includes, for example, a control proxy element and one or more end points. The control proxy element may be adapted, for example, to receive a non-Ethernet frame that includes, for example, a proxy header, a proxy footer and a proxy payload. The control proxy element may be adapted, for example, to generate an Ethernet frame that includes, for example, an Ethernet header, a proxy association header and the proxy payload. The Ethernet header may relate to, for example, an end point. The one or more end points may be coupled to the control proxy element via an Ethernet-based network and may be adapted, for example, to receive the generated Ethernet frame over the Ethernet-based network.

In another embodiment according to some aspects of the present invention, a system that provides communication between an Ethernet-based system and a non-Ethernet-based system includes, for example, an end point and a control proxy element. The end point may be adapted, for example, to generate an Ethernet frame that includes, for example, a non-Ethernet frame, a proxy association header and an Ethernet header. The Ethernet header may relate to, for example, a control proxy element. The control proxy element may be coupled to the end point. The control proxy element may be adapted, for example, to receive the generated Ethernet frame over an Ethernet-based network and may be adapted, for example, to send the non-Ethernet frame over a non-Ethernet-based network.

In another embodiment according to some aspects of the present invention, a system that provides communication between a first set of machines and a second set of machines may include, for example, an internal zone. The internal zone may include, for example, the first set of machines, a proxy for use with at least one of a native protocol and a foreign protocol, an Ethernet switch and an Ethernet. The first set of machines may communicate with each other over the Ethernet and the Ethernet switch. The second set of machines may be disposed outside of the internal zone and may communicate with the first set of machines through the proxy or may communicate with the first set of machines natively over the Ethernet. The first set of machines may be protected by the switch from state access or configuration access from outside the internal zone.

In yet another embodiment according to some aspects of the present invention, a system that provides communication between a first set of machines and a second set of machines may include, for example, an internal zone. The internal zone may include, for example, the first set of machines, an Ethernet switch and an Ethernet. The first set of machines may communicate with each other over the Ethernet and the Ethernet switch. The second set of machines may be disposed outside of the internal zone and may communicate with the first set of machines natively over the Ethernet. The first set of machines may be protected by the switch from state access or configuration access from outside the internal zone.

In yet still another embodiment according to some aspects of the present invention, a method of providing a partial proxy may include, for example, one or more of the following: associating an end point and a proxy with a unified zone, the unified zone comprising a unified infrastructure over an Ethernet; exposing, by a proxy, the internal end point as a native end point or a foreign end point to an entity external to the unified zone; exposing, by the proxy, the external end point as the native end point or the foreign end point to an internal entity or the end point in the unified zone; sharing parameters between the proxy and the end point, the parameters relating to communications with the entity external to the unified zone; and configuring the end point with a generic IO model that can be adapted for use with a particular protocol or a particular network that is external to the unified zone.

These and other features and advantages of the present invention may be appreciated from a review of the following detailed description of the present invention, along with the accompanying figures in which like reference numerals refer to like parts throughout.

BRIEF DESCRIPTION OF THE DRAWINGS

FIG. 16 shows a table of some embodiments of service delivery systems according to some aspects of the present invention.

FIG. 31 shows an embodiment of an FC-2 Fibre Channel frame header according to some aspects of the present invention.

DETAILED DESCRIPTION OF THE INVENTION

Figure 1:
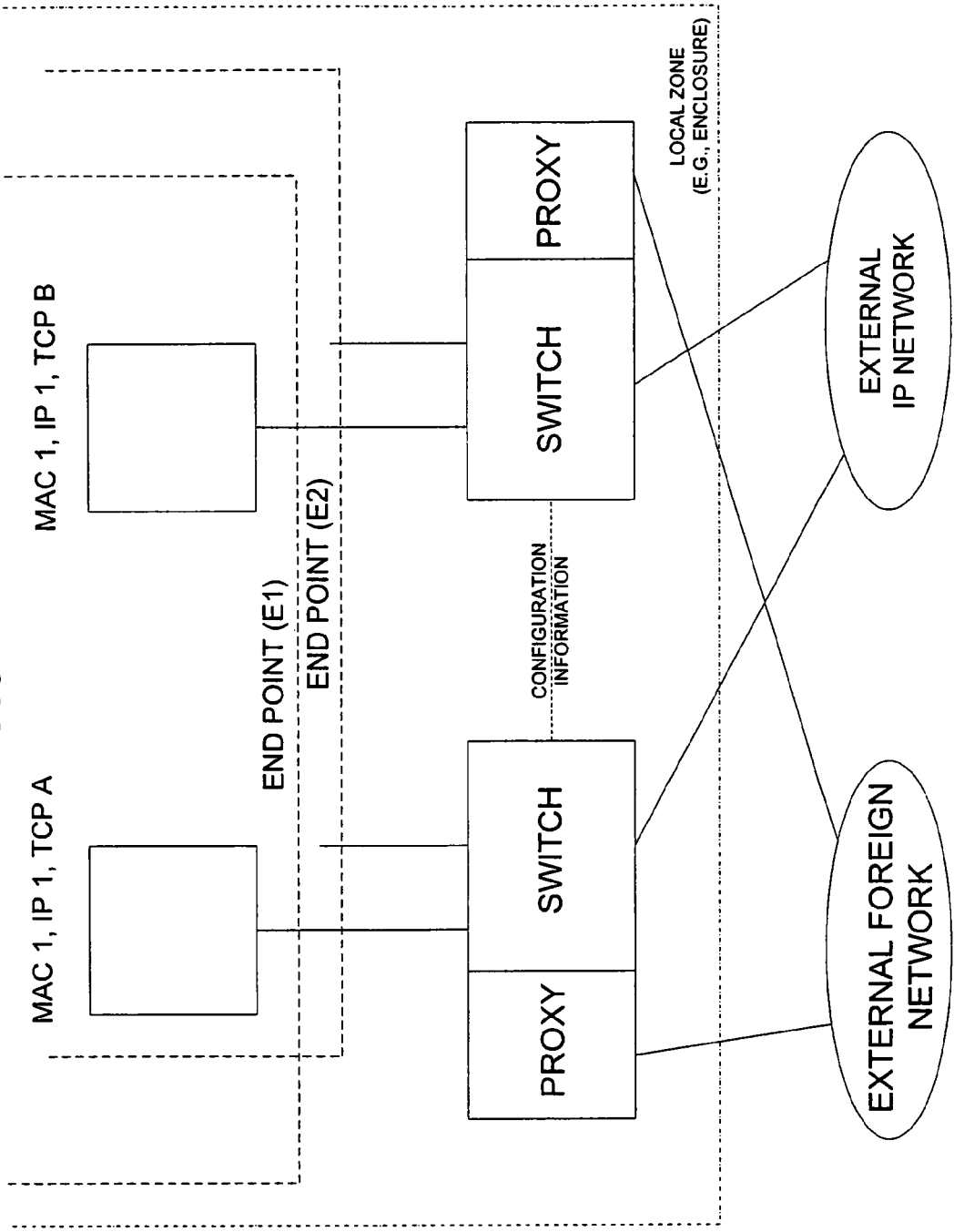
FIG. 1 shows a block diagram of an embodiment of a unified system over Ethernet according to some aspects of the present invention.

Some embodiments according to some aspects of the present invention provide systems and method that unify multiple networks using a particular network fabric as an underlying network protocol. Some embodiments according to some aspects of the present invention provide that the underlying network protocol include, for example, an Ethernet protocol or an internet protocol (IP).

Some embodiments according to some aspects of the present invention provide that the unification of networks be transparent to external networks or external entities.

Some embodiments according to some aspects of the present invention provide one or more end points and one or more control proxy elements. Intelligence can be distributed between an end point and a control proxy element to allow for the unification of networks over a common Ethernet network protocol.

Some embodiments according to some aspects of the present invention provide that the distribution of intelligence between an end point and a control proxy element be effected, at least in part, by communication between the end point and the control proxy element. The communication may carry out, for example, equivalent or similar functions generally that can be accomplished in a non-unified network.

Some embodiments according to some aspects of the present invention provide that one or more control proxy elements may be placed or may be distributed at several physical points, providing added flexibility to the unification.

Some embodiments according to some aspects of the present invention provide that an end point include, for example, one or more server end points (e.g., server blade end points) and that a control proxy element reside in or be coupled to, for example, one or more network switches. Some embodiments according to some aspects of the present invention provide that the control proxy element reside in a shared server blade. Some embodiments according to some aspects of the present invention may provide, for example, reduced complexities and reduced costs compared with more traditional approaches.

Some embodiments according to some aspects of the present invention provide that external networks coupled to one or more control proxy elements include, for example, one or more of the following: a storage fabric over an iSCSI network, an NFS network, a Fibre Channel network (e.g., a Fibre Channel SAN) or other protocol for carrying storage traffic, an RDMA network (e.g., RDMA over TCP or Infiniband or another proprietary protocol), an Ethernet network (e.g., for data or management purposes, etc.), and a TCP/IP network.

Some embodiments according to some aspects of the present invention allow Ethernet to be the carrier of choice for traffic inside a unified zone even in the case in which Ethernet is not the carrier of choice outside the unified zone. Even if other technologies are connected to the unified zone, the unified zone seamlessly uses Ethernet as a carrier within the unified zone.

Some embodiments according to some aspects of the present invention provide that the unified zone include at least some aspects of a load-balancing-and/or-fail-over zone as described, for example, in U.S. patent application Ser. Nos. 10/938,156, 60/501,794 and 60/507,638, which are incorporated herein by reference in their entirety.

Some embodiments according to some aspects of the present invention provide that the operating system (OS) provide comprehensive external connectivity to different networks while minimizing the amount of additional complexity from the network interface (e.g., a network interface card (NIC)). Some embodiments according to some aspects of the present invention provide for use of a unified network without modifications to the end point's software such as, for example, the OS.

Some embodiments according to some aspects of the present invention provide for a minimal set of parameters exchanged between an end point and a control proxy element to provide that Ethernet, for example, be the carrier of choice for traffic inside a unified zone and/or to provide comprehensive external connectivity to different networks (e.g., networks that are of type other than Ethernet) coupled to the control proxy element.

Unified Networking Infrastructure Over Ethernet

FIG. 1 shows a block diagram of an embodiment of a unified system over Ethernet according to some aspects of the present invention. The unified system may include, for example, a unified zone (e.g., a local zone). The unified zone may include, for example, one or more end points and one or more network switches. The end point may include, for example, a server blade. The server blade may include, for example, one or more NICs or other types of adapters or interfaces. The network switch may include, for example, a control proxy element. Although illustrated as having multiple end points and multiple control proxy elements, some embodiments according to some aspects of the present invention may have more or less than the number of components illustrated in FIG. 1. The end point may be connected to one or more network switches via its one or more NICs. The network switches, if there is more than one switch, may be connected to each other. The control proxy elements of the one or more network switches may be connected to one or more networks external to the unified zone. The external networks may include, for example, a storage fabric over an ISCSI network, an NFS network, a Fibre Channel network (e.g., a Fibre Channel SAN) or other protocol for carrying storage traffic, an RDMA network (e.g., RDMA over TCP or Infiniband or another proprietary protocol), an Ethernet network (e.g., for data or management purposes, etc.), and a TCP/IP network.

In operation according to some embodiments in accordance with some aspects of the present invention, an external network using a particular network fabric communicates with an end point in a unified zone using a control proxy element.

The communication from the external network includes, for example, communication packets in accordance with a respective communication protocol employed by the external network. Some embodiments according to some aspects of the present invention provide that the control proxy element, or a network device (e.g., a network switch or a shared server blade) that includes a control proxy element, processes the incoming communication packets and removes the payload of the communication packets. The payload is then reframed according to the Ethernet protocol and communicated to the NIC of the end point. The control proxy element may maintain, for example, some of the control state used for communication over the external network or may maintain and share some of the control state with the end point for its processing and maintenance or may forward the entire control state to the end point. This may be carried in an Ethernet frame, for example.

Communication from the end point of a unified zone to the external network (e.g., a network external to the unified zone) is processed using the control proxy element or a network device (e.g., a network switch or a shared server blade) that includes a control proxy element. The control proxy element or the network device receives communication packets in accordance with the Ethernet protocol. In some embodiments according to some aspects of the present invention, the payload is removed by the control proxy element or the network device and one or more frames are generated in accordance with the communication protocol of the external network. The generated frames are then placed on the particular network fabric to the external network. In some embodiments according to some aspects of the present invention, the payload is an external protocol-ready frame that the control proxy element or the network device can route on the particular network fabric to the external network. The control proxy element may maintain some of the control state for the external network, or may maintain it but share it with the end point or may forward the control information from the end point that processes it and maintain it. This may be carried in an Ethernet frame.

The control proxy element and the end point may have different roles. Some embodiments according to some aspects of the present invention provide a generic end point with no functionality specific to a particular foreign network. Some embodiments according to some aspects of the present invention provide that the end point is aware of a minimal set of specific parameters and state information. Such awareness may be advantageous with respect to, for example, performance, functionality, management, discovery, security as well as other services. The end point and the control proxy element may share, for example, state information as described herein.

Some embodiments according to some aspects of the present invention provide that the endpoint, the control proxy element and/or the combination of the end point and the control proxy element appear to the external network as merely a standard external network entity (e.g., a standard external network end point or a standard external network switch port). The external network need not be aware of the processing of its communication packets by the control proxy element (or the network device that includes a control proxy element) and the end point. The communication can be seamless from the perspective of the external network despite the fact that the internal network fabric of the unified zone and the external network fabric may be of different types.

Some embodiments according to some aspects of the present invention provide that the unified zone is an enclosure (e.g., one or more server blade racks or an administrative zone that includes the one or more server blade racks and network switches) under local administration or control. In some embodiments according to some aspects of the present invention, the enclosure provides particular optimizations, reduced costs and reduced complexities for the end points. In some embodiments according to some aspects of the present invention, minimal functionality at the end point can support external networks.

Some embodiments according to some aspects of the present invention provide for a host model for MAC and IP address as described, for example, in U.S. patent application Ser. Nos. 10/938,156, 60/501,794 and 60/507,638, which are incorporated herein by reference in their entirety.

Some embodiments according to some aspects of the present invention provide for mutual discovery between an end point and a control proxy element. The end point and the control proxy element may share session-specific parameters. Furthermore, during data exchange between an end point and a peer on an external network, the control proxy element and the end point may have different roles.

Some embodiments according to some aspects of the present invention provide that a kernel driver on an end point or another entity with a high level of trust may be, for example, the only entity with ability to configure the control proxy element. The kernel driver may provide at least a substantial level of security, for example, from user level applications. The kernel driver may use aspects of cryptography such as, for example, a shared secret to enable communication.

In configurations of the unified zone including multiple hosts, some embodiments according to some aspects of the present invention provide that one host configure the control proxy element, in particular, for a non-independent control proxy element. For example, assuming that all the hosts have the same configuration image for the control proxy element, the first host to boot may be designated to configure the control proxy element or user provided configuration information or enclosure-wide management entity can designate the host to provide configuration to the control proxy element or to configure the control proxy directly (e.g., without end-point involvement). The enclosure management entity or the switch control unit may be involved in selecting the host to configure the control proxy element or to provide the proxy configuration without relying on any host to execute this role. This discovery and configuration stage may be authenticated.

Some embodiments according to some aspects of the present invention provide that the control proxy element be able to boot independently of end points. In such a case, a mechanism may provide resource allocation for end points. This may ensure that end points do not consume resources that the end points do not own.

Some embodiments according to some aspects of the present invention may provide for a private (layer 2) L2 Address, LLC, a well-known UDP port or a light weight protocol to be used for discovery and/or for configuration purposes. Switch protection may be provided to ensure that the configuration is sourced from one of the internal end points or from the enclosure management entity or for the switch control unit. Authentication may be optional. Link parameters may be communicated between the end point and the control proxy link. Some embodiments according to some aspects of the present invention may provide for a fixed frame format for negotiation on a dedicated local L2 address. The switch may be aware of the L2 address pair for communication between the configuration entity (e.g., an end point or enclosure management) and the control proxy element. The switch may block external traffic to the control proxy element addresses and may allow only internal traffic to these addresses. The switch can create a safe internal space for exchanging configuration or other sensitive information, thereby preventing an external attacker from compromising the system.

Some embodiments according to some aspects of the present invention may provide for particular parameters. For example, the maximum transport unit (MTU) may be, for example, the Ethernet MTU which is 1500 B. Some parameters may relate to LLC options or VLAN. Standard Ethernet settings need not be communicated. However, special settings (e.g., an extended MTU to include the additional internal headers while leaving the standard 1500 B to the payload or Jumbo frame support) may be signaled and then enabled.

Figure 2:
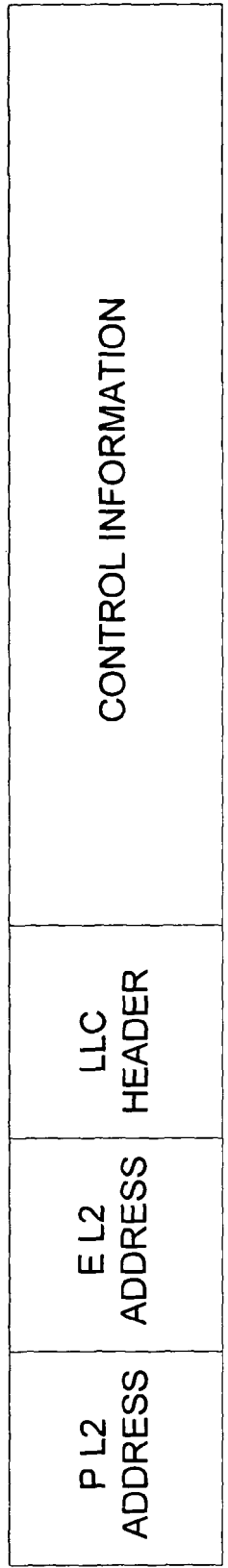
FIG. 2 shows an embodiment of a frame format for proxy configuration according to some aspects of the present invention.

FIG. 2 shows an embodiment of a frame format for proxy configuration according to some aspects of the present invention. As illustrated, the frame may include, for example, control information which is encapsulated by an LLC header. An end point L2 address or an enclosure management L2 address encapsulates the LLC header and the control information. A control proxy element L2 address encapsulates the end point L2 address or the enclosure management L2 address, the LLC header and the control information.

Figure 3:
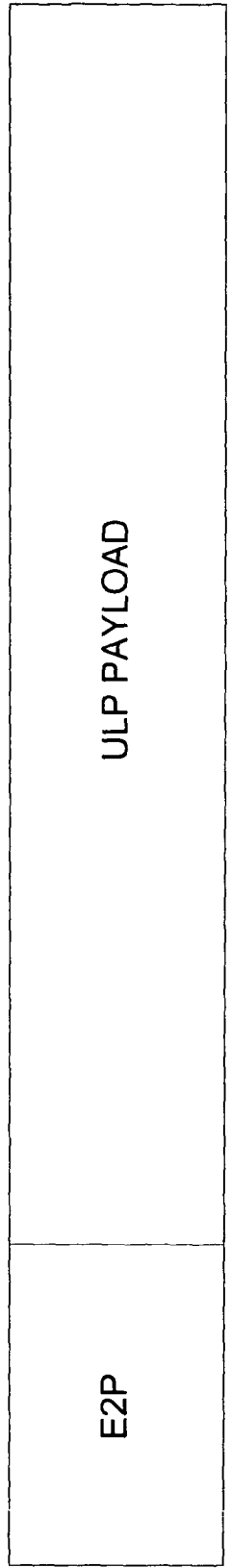
FIG. 3 shows an embodiment of a frame format for session specific configuration according to some aspects of the present invention.
Figure 4:
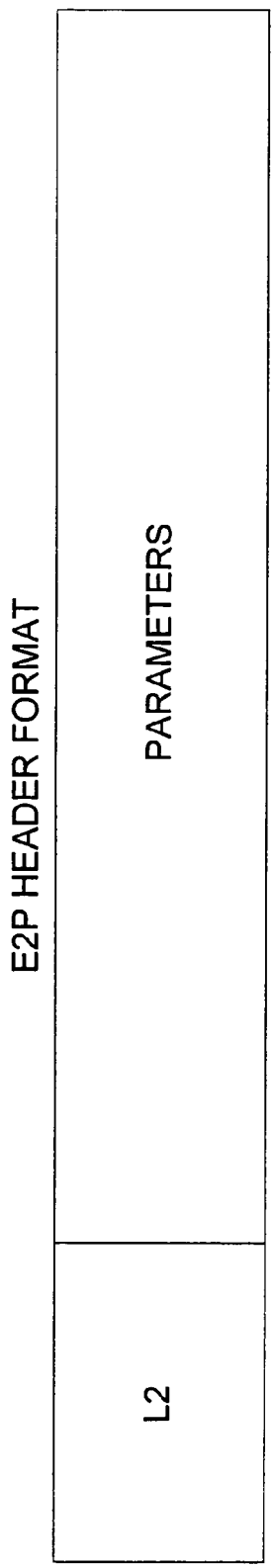
FIG. 4 shows an embodiment of an end-point-to-proxy (E2P) format according to some aspects of the present invention.

After the control proxy element configuration is completed and discovery between every end point and control proxy element is completed, one or more interested end points can engage the control proxy element to configure them for session-specific communications. Some embodiments according to some aspects of the present invention may share session-specific parameters between an end point and a control proxy element. An embodiment of the frame format for session-specific configuration is illustrated in FIG. 3 and an end-point-to-control-proxy-element (E2P) header format is further illustrated in FIG. 4 according to some aspects of the present invention. The following describes some exemplary L2, L3, L4 and L5 parameters. However, the present invention also contemplates using other parameters not specifically described herein but known to one of ordinary skill in the art. For example, some L2 parameters may include an MTU parameter, a VLAN parameter and LLC option parameters. The frame format for session-specific configuration may accommodate, for example, an external network MTU and native overhead such as L2 overhead or end-point-to-control proxy element communication fields E2P. With respect to L2 parameters, VLAN parameters may be specific per session, per E2P or per protocol (e.g., iSCSI). In another example, L3 routing could be used if the enclosure is more complex; otherwise, routing may not be needed for one hop.

In yet another example, L4 parameters may be useful, for example, in guaranteeing delivery or in-order delivery. An L2 frame can get lost, for example, via CRC error or switch drop, between an end point and a control proxy element even if no congestion occurs. However, congestion may be experienced, simply due to multiple end points communicating with the control proxy element and over subscribing the switch link or links to the control proxy element. In the case in which the two end-to-end, communicating peers (e.g., an internal end point or its control proxy and an external end point) run some sequencing scheme and recovery at the transport (L4) and/or at the session layer (L5), a dropped frame will be noticed. As this is a relatively rare event, it may be an acceptable outcome for some applications. However, recovery at these levels transport layer or session layer may be slow. In the case in which there is no such mechanism at the session layer or in the case in which a higher level of performance is expected even if a frame is dropped, the following operations may be supported by the end-point-to-control-proxy-element (E2P)

communications: sequencing and retransmit. In addition, credit and/or flow control may be carried over from the external network, if exists or created locally for the enclosure internal communication link to prevent congestion. It might be assumed, for example, that there is no congestion in the local network (in case non-blocking architecture is used), and in that case, if the external network has an embedded credit scheme, it may be terminated at the control proxy element and not used inside the enclosure. L4 or L5 parameters can also provide data integrity. For example, data integrity over the local link may be handled by Ethernet (L2) CRC, but in case the external network or protocol employs data integrity mechanisms (over the control information and/or over the payload) it may be extended all the way to the end point.

L5 parameters may relate, for example, to one or more of the following: target name; initiator and target session ID; security (e.g., yes/no, secret such as, for example, CHAP, Insect keys, etc.); and connection-specific parameters. (Other parameters such as, for example, QP, STAG, etc. may be relevant for an RDMA session. Storage-related parameters are used herewith as merely examples.) Examples of connection-specific parameters relating to iSCSI may include, for instance, one or more of the following: PDU size; multi-connection-per-session (MC/S) support; MaxBurstLength; MaxUnsolicited; and optional use and distance of fixed interval marking (FIM). Some embodiments according to some aspects of the present invention may provide further simplicity by running inside the enclosure a collapsed layering scheme in which there is no duplication of mechanisms in different layers and by saving mechanisms such as, for example, congestion, routing, digests, etc.

Some embodiments according to some aspects of the present invention provide session level service. The session level services may typically be non-real-time, critical services. However, end-to-end operations and operating system involvement at the end point may be expected. The end point may provide session level services over IP. Session level services may include, for example, one or more of the following: name services, discovery, login and security. Name services may include, for example, finding a partner or target by using a WWID and receiving a network address in return. In one example, the host may employ iSNS. Discovery may include, for example, finding partners that match a specific request by an end point. In one example, discovery may be implemented via, for example, iSNS, SLP protocol, iSCSI well know port, or proprietary means. Security may include, for example, session authentication. The end point can run the protocol or offload to the control proxy element. Session authentication may be achieved by using per frame authentication or encryption as described in, for example, U.S. Patent Application Ser. No. 60/431,087 filed Dec. 5, 2002 and U.S. patent application Ser. No. 10/727,430 filed Dec. 4, 2003, which are incorporated herein by reference in their entirety.

Some embodiments according to some aspects of the present invention provide end point operations. A stack posts operation to a unified network controller residing on an end point. For example, for storage, a software layer submits a request. The request can be partially processed on the end point or encapsulated and sent over Ethernet to the control proxy element. The storage stack may post, for example, a SCSI request. Command descriptor blocks (CDBs) and SCSI request blocks (SRBs) may be employed as known in the art. Some operations are performed by the endpoint while others can be offloaded to the control proxy element to reduce cost complexity on the endpoint.

End point operations options may be further described in view of a storage example and an iSCSI example. Some options may include, for example, one or more of the following: SCSI CDB over Ethernet; SCSI CDB and some session (e.g., iSCSI); SCSI CDB embedded inside iSCSI (e.g., fall iSCSI, simplified transport (E2P)); SCSI CDB and iSCSI over TCP offload engine.

End point operations options may be further described in view of a Fibre Channel example. Some of the same options may apply for Fibre Channel as described above with respect to storage and iSCSI; however, Fibre Channel may be layered and can be broken in few more options including, for example, one or more of the following: SCSI CDB over Ethernet; SCSI CDB and some session (e.g., Fibre Channel protocol); SCSI CDB embedded inside Fibre Channel (e.g., more Fibre Channel layers or full Fibre Channel, simplified transport); and SCSI CDB and Fibre Channel over TCP offload engine.

In the iSCSI example, SCSI CDB may be posted from the end point to the control proxy element. If MTU of the external network is different from the MTU inside the enclosure, then the control proxy element may provide segmentation or the end point can provide segmentation (however, in the case the external MTU is larger than the internal MTU, that may yield reduced efficiencies). Segmentation may be performed as set forth by the minimum of the MTU on the local network and the Session PDU size. Or when done by the control proxy element, the external network MTU can be used, provided buffering and segmentation are provided by the control proxy. If digest (e.g., CRC32c for the header and/or data) or fixed-interval-marking (FIM) are enabled, then the control proxy element may have the hardware execute them efficiently at a speed matching the external network bandwidth, thus reducing the complexity of the end point (e.g., eliminating the need to replicate it at every end point). The control proxy element may also assume responsibility for recovery. It can be done by issuing a special request to the end point to retransmit or take other actions or it can be done solely by the control proxy element. To support iSCSI within-command recovery without involving the end point, the proxy element may need to buffer data and state.

Figure 5:
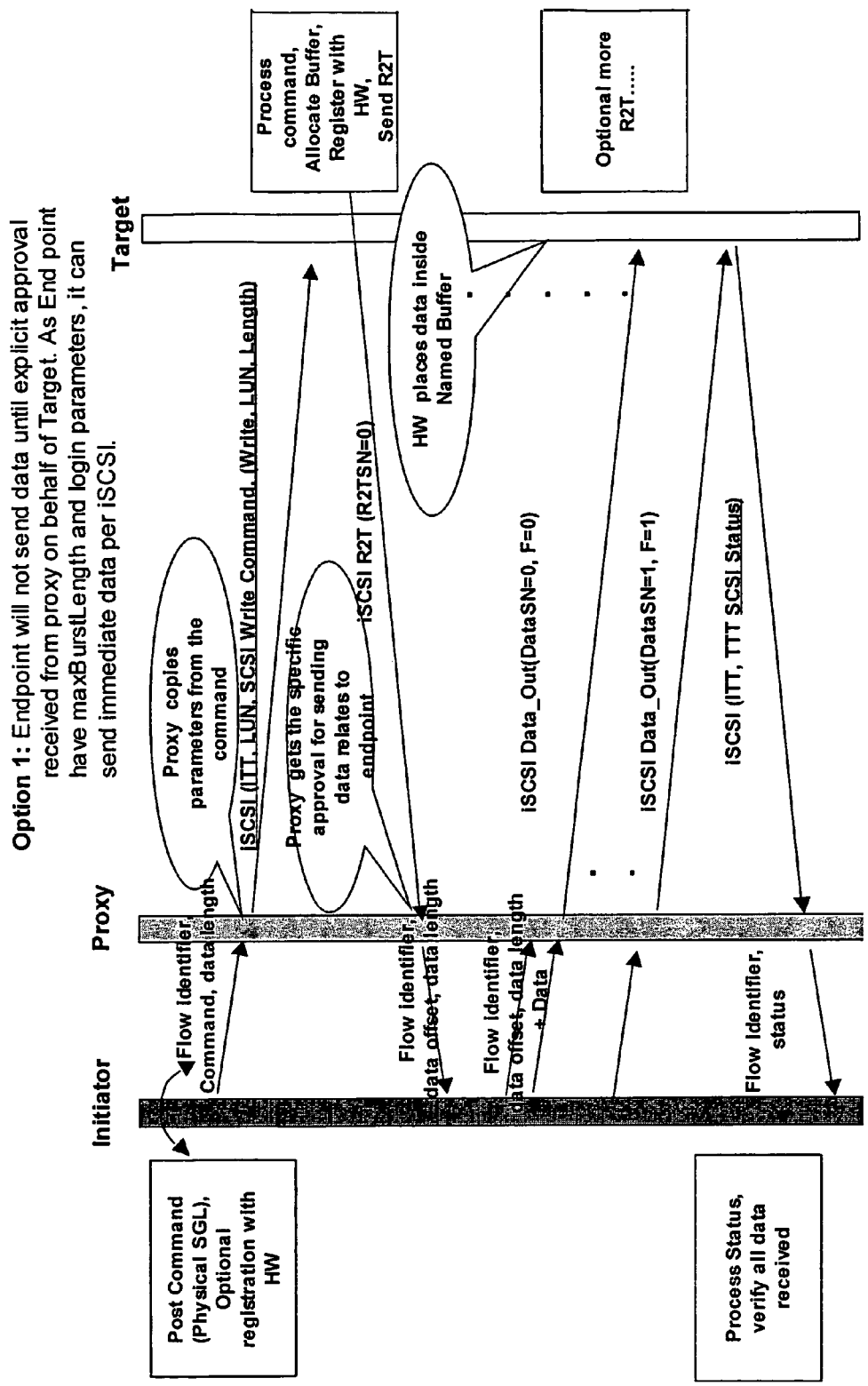
FIG. 5 illustrates an embodiment of an initiator iSCSI Write operation in which an end point does not send data until the end point receives approval from a control proxy element on behalf of a target according to some aspects of the present invention.
Figure 6:
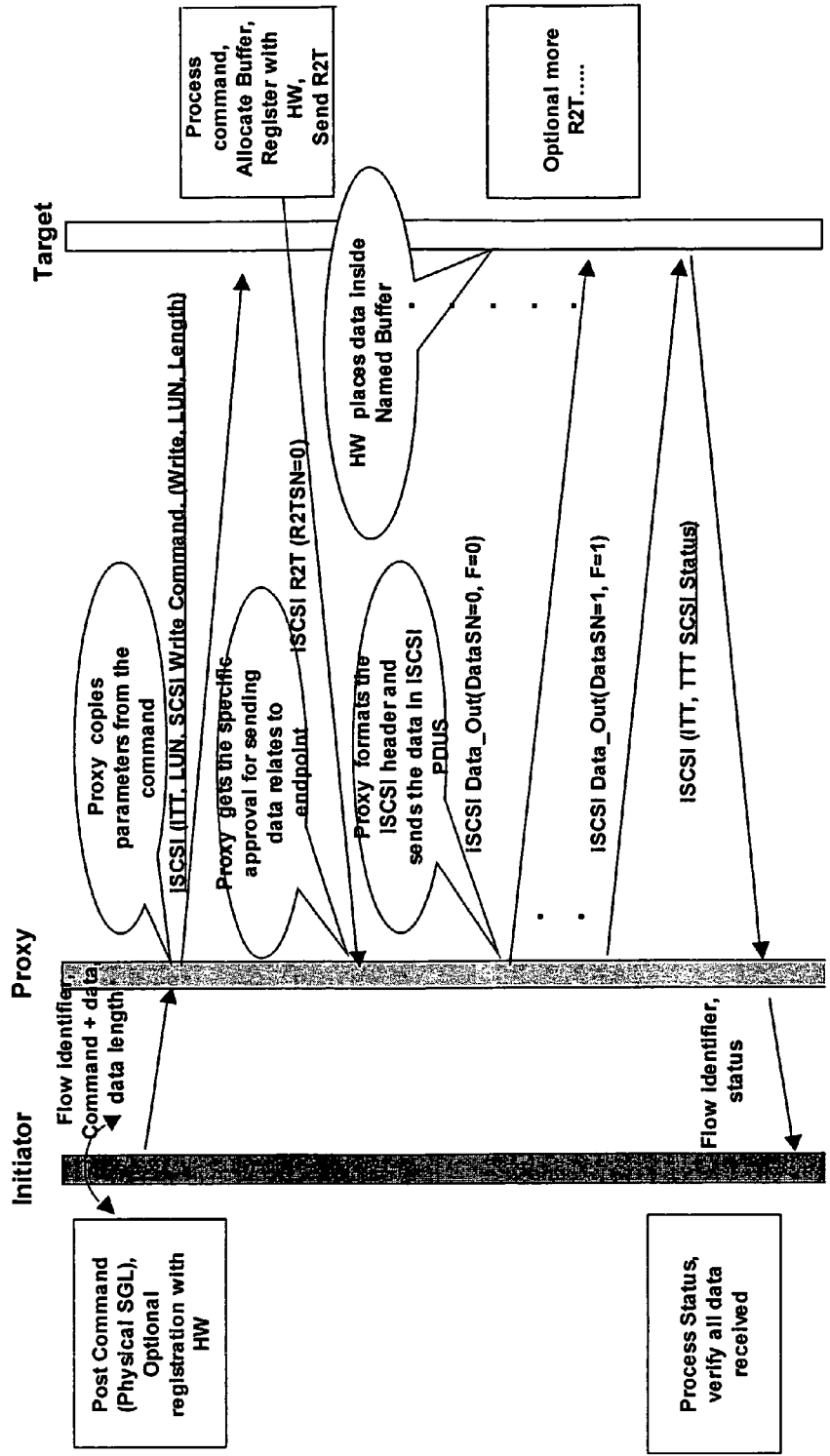
FIG. 6 illustrates an embodiment of an initiator iSCSI Write operation in which an end point sends data to a control proxy element according to some aspects of the present invention.

FIGS. 5 and 6 show embodiments of initiator iSCSI write operations according to some aspects of the present invention. FIG. 5 illustrates an option in which an end point has limited scope for the specific protocol being run (i.e., a subset of the state) and can do basic operations in a generic way. For the example of IO Write per iSCSI, the end point sends the command through the proxy to the external target. The proxy handles all the specific semantics of iSCSI and can format the request as required by the iSCSI protocol. When the target replies with a ready-to-transfer (R2T) message, the proxy interprets it. The end point does not send data until the end point receives explicit approval from control proxy element on behalf of a target. Since the end point, in this example, keeps some parameters specific to the session (e.g., max-BurstLength and login parameters), the end point can send the data per iSCSI. FIG. 6 illustrates an option in which the end point has an even more limited set of session-related state information. When the end point has data to be sent to the external target as in an IO Write, the end point sends all data following the command to control proxy element, for example, based on E2P credit. The E2P credit prevents a case in which the end point consumes more than the resources available at the proxy element. The control proxy element buffers the data until a R2T PDU is received.

Figure 7:
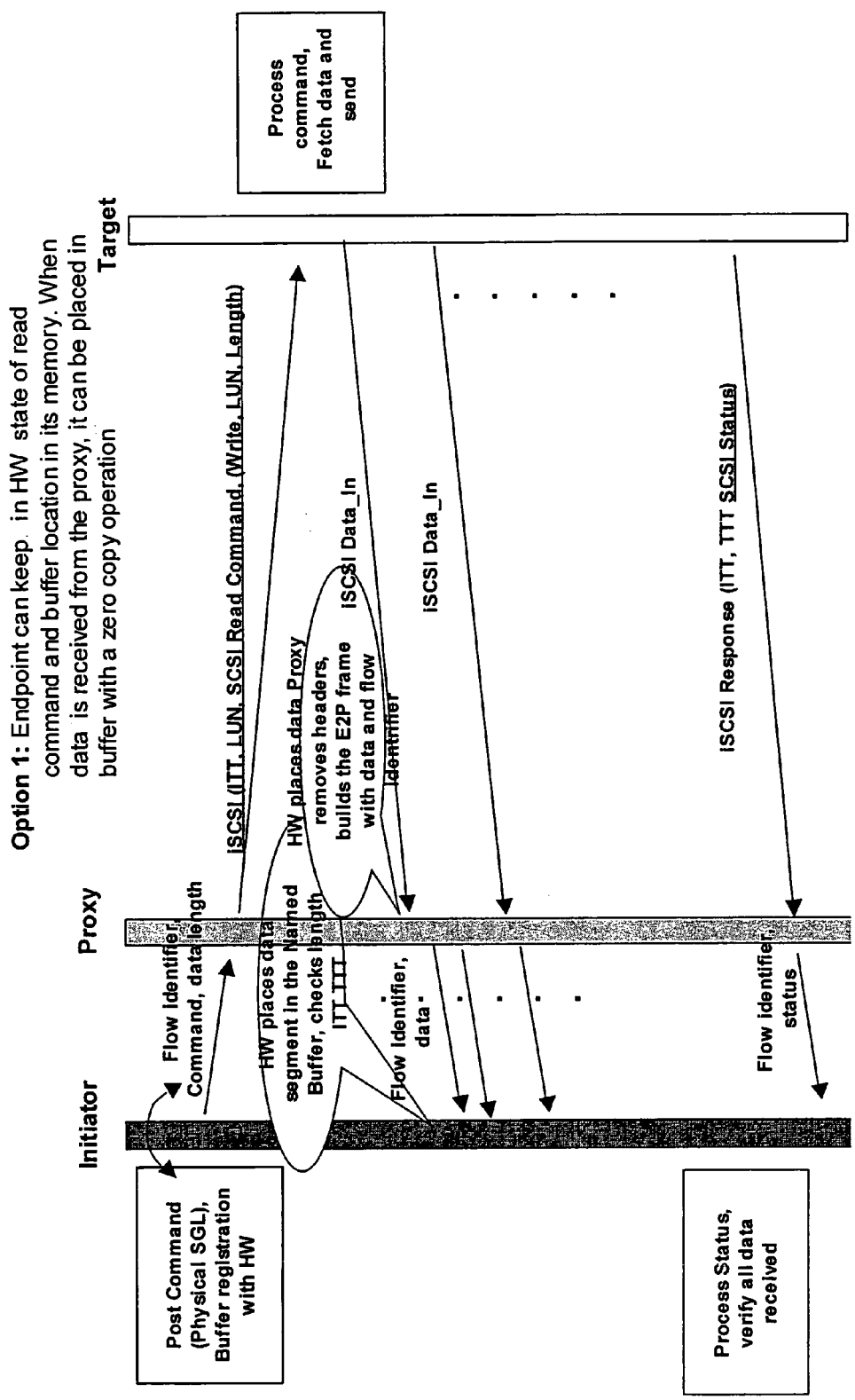
FIG. 7 shows an embodiment of an initiator iSCSI read operation according to some aspects of the present invention.
Figure 8:
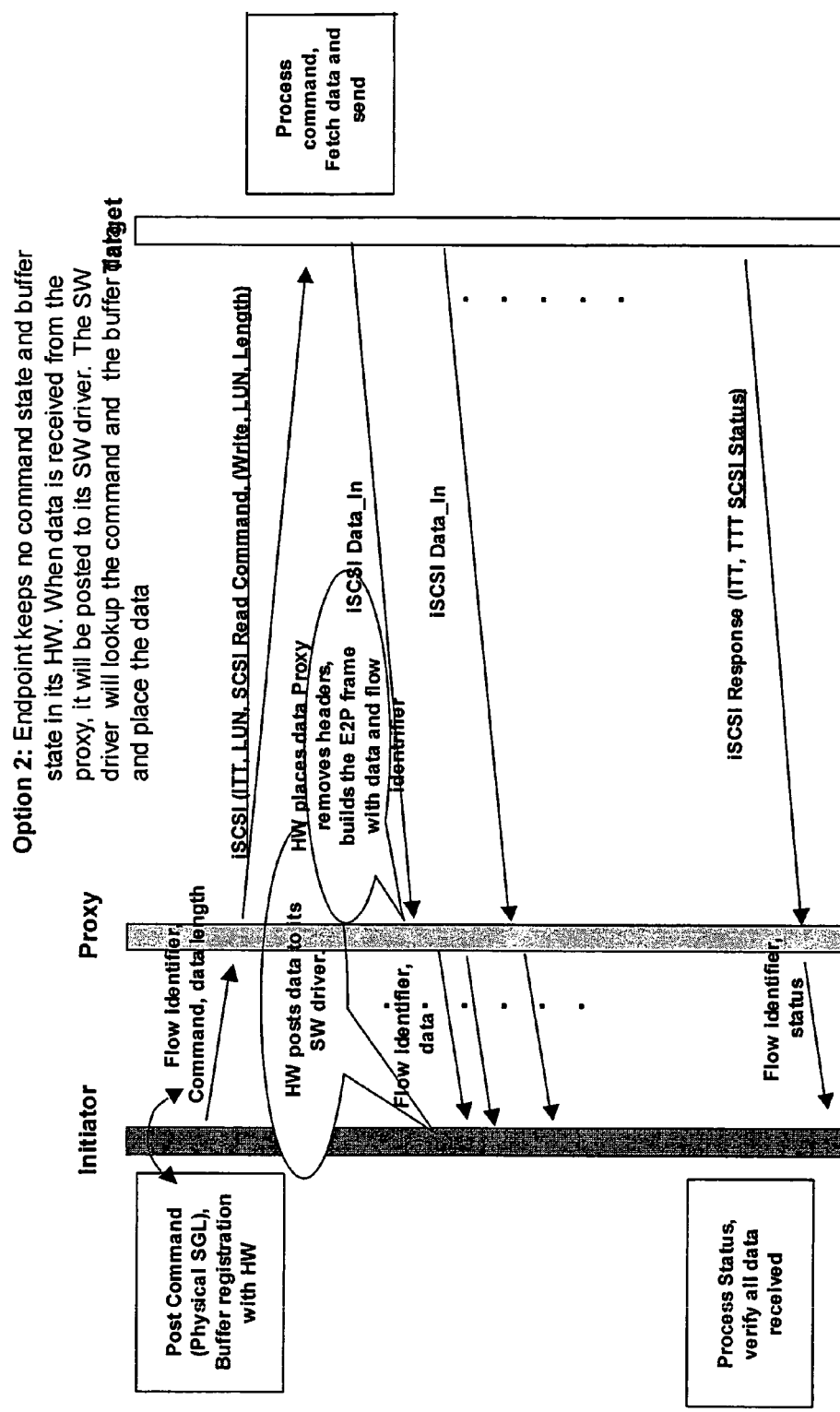
FIG. 8 shows an embodiment of an initiator iSCSI read operation according to some aspects of the present invention.

FIGS. 7 and 8 show embodiments of initiator iSCSI read operations according to some aspects of the present invention. FIG. 7 illustrates an option in which an end point has limited scope for the specific protocol being run (e.g., a subset of the state) and can do basic operations in a generic way. For the example of IO Read per iSCSI, the en point sends the command through the proxy to the external target. The proxy handles all the specific semantics of iSCSI and can format the request as required by iSCSI protocol. When the target replies with the data as requested, the proxy interprets it and sends the data with the simplified internal format (e.g., generic format) to the end point. The end point may keep, in hardware or in software, the state of a read command and a buffer location in its memory. When data is received from the control proxy element, the end point can place in the buffer with a zero copy operation, as it has the ability to match the data received with a named buffer and offset into that buffer. This provides the same level of benefits in terms of, for instance, host CPU utilization and memory bandwidth consumption on the end point, as would be expected from a full iSCSI offload card. FIG. 8 illustrates an option in which the end point has an even more limited set of session-related state information. When the end point requests data from the external target as in an IO Read, then the end point does not keeps command state or buffer state in its hardware, thus minimizing cost and complexity of that hardware. When data is received from the control proxy element, the data may be placed in a buffer by the end-point hardware and then may be posted to the software driver of the end point. The software driver can look up the command and the buffer and place the data.

Some embodiments according to some aspects of the present invention may provide for expedited data acceleration. The organization of data in the host memory and the manner in which data is transferred over the IO expansion bus (e.g., PCI bus) when a NIC is used affect overall performance. Hardware accelerated direct memory access (DMA) of physical linked lists can be accomplished in a similar fashion as a NIC or HBA, although some simplification of the state content managed by the end point hardware may be proposed. In some cases, the hardware accelerated DMA may maintain local bus efficiency and consume as few CPU cycles as possible, similar to a NIC or HBA holding the protocol or network-specific full state.

Networking

Figure 9:
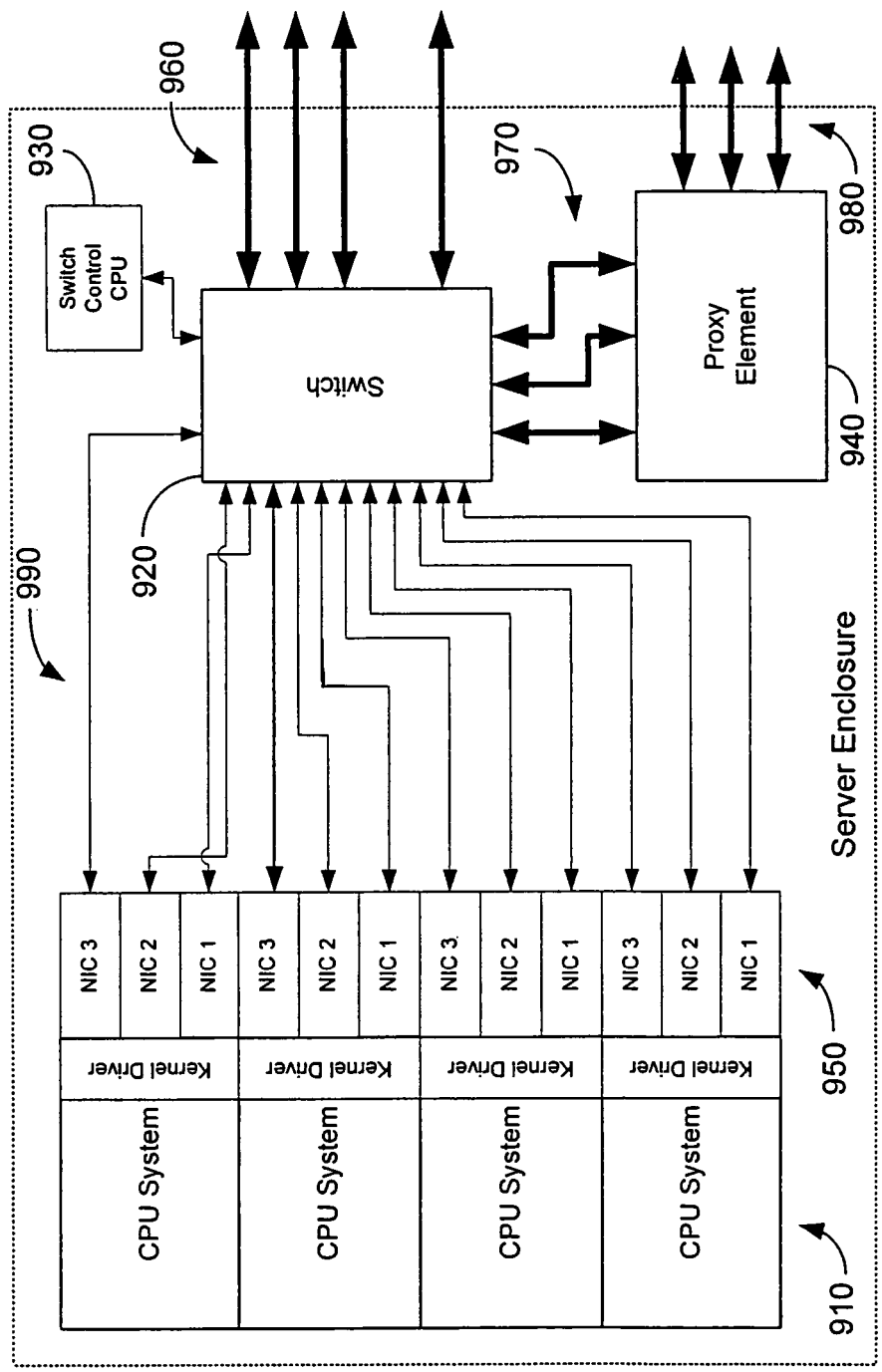
FIG. 9 shows a block diagram of a server enclosure according to some aspects of the present invention.

FIG. 9 shows a block diagram of a server enclosure according to some aspects of the present invention. The server enclosure may include, for example, one or more server elements 910 (e.g., end point), a switch 920, a switch control CPU 930 and a control proxy element 940. Each sever element may include, for example, a CPU system, a kernel driver and one or more NICs 950. Each NIC may be connected, for example, to the switch. The switch may be adapted, for example, to connect all of the server elements. The switch may be adapted, for example, to provide one or more connections 960 to and from the server enclosure. The switch may be adapted, for example, to provide one or more connections 970 to the control proxy element. The control proxy element may be adapted, for example, to provide one or more independent connections 980 to and from the server enclosure.

The control proxy element 940 may be adapted to provide a proxy protocol service that may include, for example, one or more of the following: standard IPSec, a Fibre Channel adapter, an iSCSI adapter, a SCSI adapter, an Ethernet adapter and an RDMA adapter. In some embodiments according to some aspects of the present invention, the proxy protocol service may cover any component in which cost or connection infrastructure makes direct implementation of the protocol service on each server element cost prohibitive. The kernel driver may provide a plurality of services. Each service may use an L2 address for its respective traffic or may use other means of de-muxing server ingress traffic. One or more of these services, referred to also as a kernel proxy driver below, may generate and receive traffic (e.g., all traffic) between a particular server element 910 and the control proxy element 940.

Figure 10:
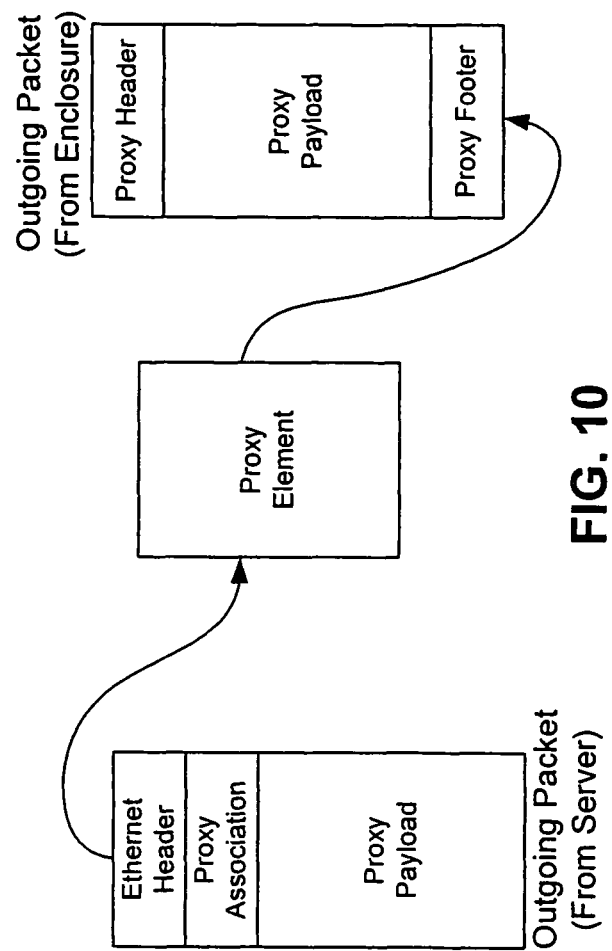
FIG. 10 shows an embodiment of an outgoing communication process according to some aspects of the present invention.

FIG. 10 shows an embodiment of an outgoing communication process according to some aspects of the present invention. The server proxy driver in the server element frames a proxy payload with a proxy connection association header and an Ethernet header. The Ethernet address may designate, for example, a control proxy element port (proxy port) which may be specified, for example, by a server element driver. The server proxy driver may also size the proxy payload to match the particular formal limits as set forth by the proxy network. The packet type may correspond, for example, to particular proxy connection association header. The proxy connection association header may select or provide context for proxy processing of the proxy payload. The control proxy element strips off the Ethernet header and the proxy connection association header and executes the proxy processing. As a product of the proxy processing, the control proxy element may generate an outgoing packing around the proxy payload. In some embodiments according to some aspects of the present invention, the control proxy element provides a proxy header and a proxy footer (e.g., a CRC trailer or IPSec trailer) before sending the outgoing packet out of, for example, the server enclosure.

Figure 11:
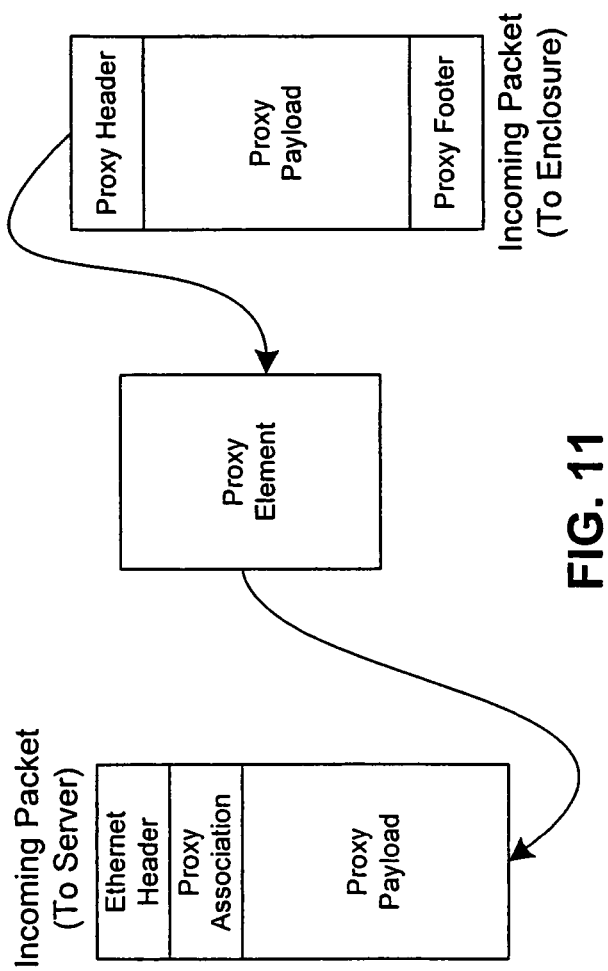
FIG. 11 shows an embodiment of an incoming communication process according to some aspects of the present invention.

FIG. 11 shows an embodiment of an incoming communication process according to some aspects of the present invention. The control proxy element receives an incoming packet, for example, from outside the server enclosure. The incoming packet may include, for example, a proxy header, a proxy payload and a proxy footer. The control proxy element strips off the proxy header and the proxy footer and performs proxy processing. The control proxy element may pass the proxy payload with few or no modifications or the control proxy element may modify the payload substantially for purposes such as, for example, decryption. Once processing is complete, the control proxy element generates an incoming packet around the proxy payload. The incoming packet communicated between the control proxy element and the server proxy driver within the server element may include, for example, an Ethernet header, a proxy connection association and the proxy payload. The Ethernet address may designate, for example, a kernel proxy driver in a server element. Packet type may correspond to or may indicate a particular proxy connection association header. The proxy connection association header may select context for processing by a kernel driver of a server element.

Figure 12:
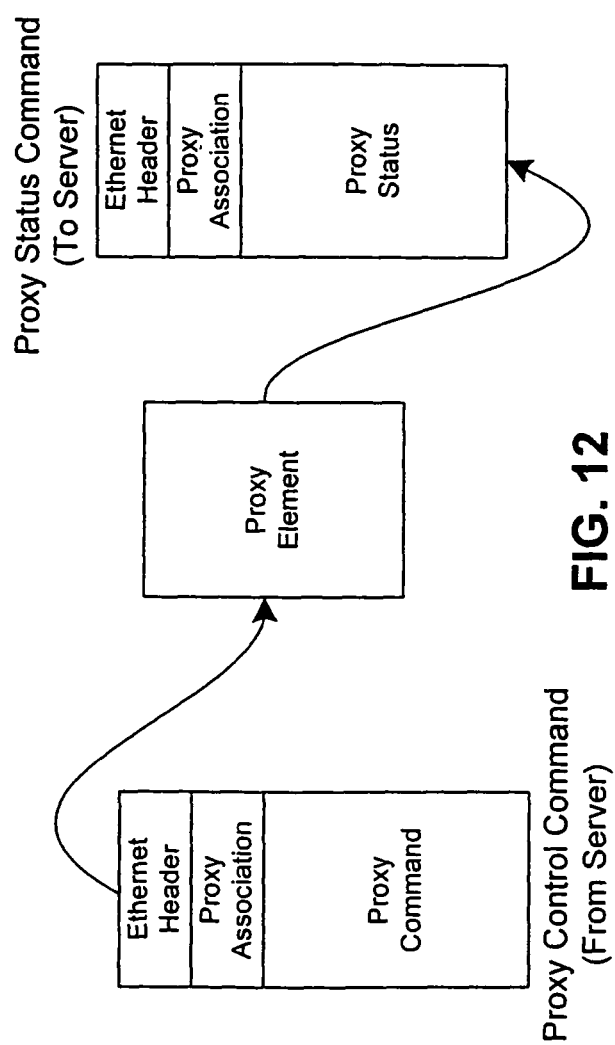
FIG. 12 shows an embodiment of a command communication process between a server proxy driver and a control proxy element according to some aspects of the present invention.

FIG. 12 shows an embodiment of a command communication process between a server proxy driver and a control proxy element according to some aspects of the present invention. The server proxy driver generates a packet destined for the control proxy element that includes, for example, an Ethernet header, a proxy connection association header and a proxy command. The control Ethernet address may designate, for example, a particular proxy port. The packet type may indicates, for example, a particular proxy connection association Header and/or particular control data. The control proxy element processes the proxy command as needed and then sends a packet destined for the server proxy driver that includes, for example, an Ethernet header, a proxy connection association header and a proxy status. The status Ethernet address may designate, for example, a kernel driver in a server element. The packet type may indicate, for example, a particular proxy connection association header and/or control data.

Some embodiments according to some aspects of the present invention may provide that one or more control proxy elements are allocated by the switch control CPU. The control/status traffic between the switch control CPU and the control proxy element may be similar to the above-described control/status traffic with respect to the server element and the control proxy element.

Referring to FIG. 9, the switch control CPU 930 may have, for example, out-of-band knowledge of the presence of the one or more server elements 910 (or end points) and the one or more control proxy elements 940. The switch control CPU may provide, for example, robust tear-down and recovery of sever/proxy resources upon the removal or reboot or any element. The switch control CPU may be used, for example, to provide secure knowledge of the switch control CPU address to server/proxy elements through out-of-band communication channels (not shown). In an optional setting, if out-of-band communication is not available, then in-band communication may be used with a timeout/heartbeat scheme, for example, to communicate address information with the switch control CPU.

In some embodiments according to some aspects of the present invention, the server kernel proxy driver and the control proxy element register their L2 addresses with the switch control CPU. With respect to server kernel proxy driver allocation of control proxy element resources, a server kernel proxy driver may request an allocation of a control proxy element resource from the switch control CPU. The server kernel proxy driver may also request an address of a proxy element resource from the switch control CPU. The server kernel proxy driver may then directly request allocations from the control proxy element using control/status encapsulation packets.

Some embodiments according to some aspects of the present invention may provide a switch control CPU with, for example, one or more of the following adaptations as set forth below. The switch control CPU 930 may provide, inside and outside switch port associations. Referring to FIG. 9, connections 990 to server elements may be known as inside connections by the switch control CPU. Connections 960 that leave the server enclosure may be known as outside connections by the switch controller CPU. The connections may be hard-wired within the server enclosure so that the switch controller CPU has pre-knowledge of connections. The switch 920 may be programmed by the switch control CPU. With respect to inside ports, packets destined for the switch control CPU L2 address or for the control proxy element L2 address or for the L2 addresses of other systems outside the enclosure may be allowed. With respect to outside ports, packets destined for the switch control CPU, control proxy element L2 address or kernel proxy driver L2 addresses on servers may be dropped. With respect to ingress rules for control proxy element ports, packets destined for the switch control CPU and the kernel proxy driver L2 address on servers may be allowed. With respect to optionally allowing the merging of infrastructure traffic onto outside ports, the switch may, in at least some instances, require knowledge of control proxy element packet fornats. This feature may be useful, for example, if the control proxy element is providing IPSec encryption/decryption services. With respect to outside port ingress rules, for IPSec, IPSec packets may be detected by the switch and forwarded to one or more control proxy element ports regardless of their L2 destination address.

Some embodiments according to some aspects of the present invention may provide a data integrity (e.g., encapsulation data integrity) with, for example, one or more of the following adaptations as set forth below. The proxy connection association header may include, for example, a sequence number that can be incremented for every packet transmitted and/or acknowledged using control packets. Retransmission may be requested by either the server proxy driver or the control proxy element when an out-of-order condition is detected by the receiver. Retransmission timeout may be used to recover from dropped packets or dropped acknowledgement at the end of a burst of commands sequence. An L2 CRC may be employed to cover packets since an Ethernet connection is guaranteed by one or more physical connections within the server enclosure. With respect to L5 encapsulation, the proxy connection association header and/or the proxy payload can be encapsulated within an L5 payload of send or write messages of a standard L5 protocol such as, for example, the RDMAC standard. In such a case, the L2 address of the packets can still be used for switching and unique IP addresses may be used by a kernel proxy driver to avoid confusion with the system stack IP services. The addresses may be attained statically or by DHCP. Furthermore, full IP routing support need not be required.

The L5 encapsulation can also be adapted to provide one or more of the following: retransmission; additional payload data integrity coverage; offloading of data integrity via an implementation of a TCP/IP/RDMA offload via a server NIC; framing of RDMA protocol and further offloading the kernel proxy driver; and zero-copy capability (e.g., for large transfers).

Software Architecture for Unified Network

Some embodiments according to some aspects of the present invention provide a software architecture for a unified network that provides one or more of the following adaptations as set forth below. The software architecture may enable high-speed network such as, for example, a Gigabit Ethernet and beyond. The unified network may be enable an interface for simultaneous multiple classes of traffic including, for example, one or more of the following: traditional data networking dominated by IP; storage networking (e.g., iSCSI); and inter-process communication (IPC) for distributed applications (e.g., RDMAC).

Figure 13:
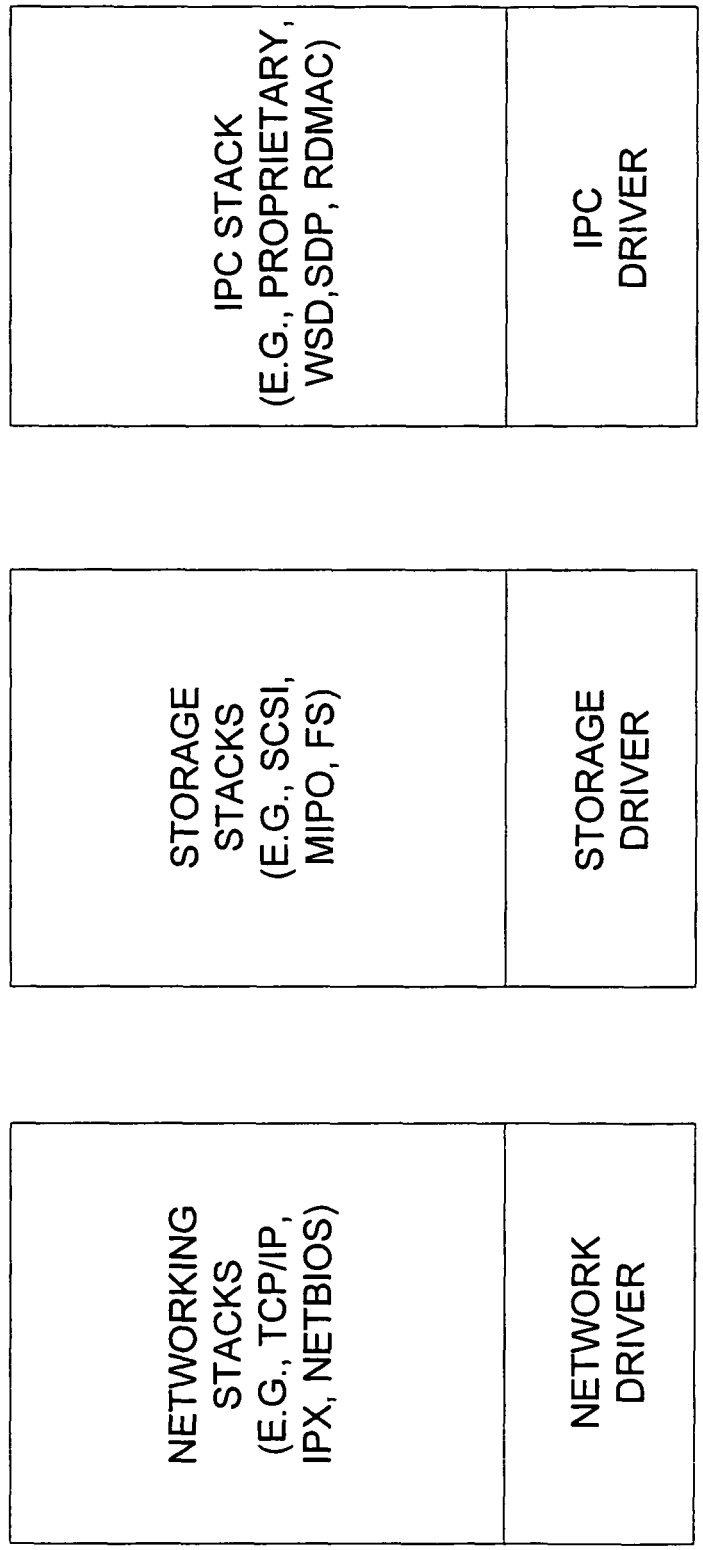
FIG. 13 shows a stack diagram of a conventional operating system according to some aspects of the present invention.

Conventional operating system architectures may make no provision for a unified network and are traditionally difficult to change in view of wide-spread deployment, long life spans and long development cycles. FIG. 13 shows a block diagram of a conventional OS including a networking stack, a storage stack and an IPC stack with respective drivers. Each stack is independent and assumes sole ownership of the underlying network. Furthermore, there is a strict requirement that no inter-driver activity is allowed. In addition, it is not possible to coordinate multiple stacks with one underlying hardware.

Figure 14:
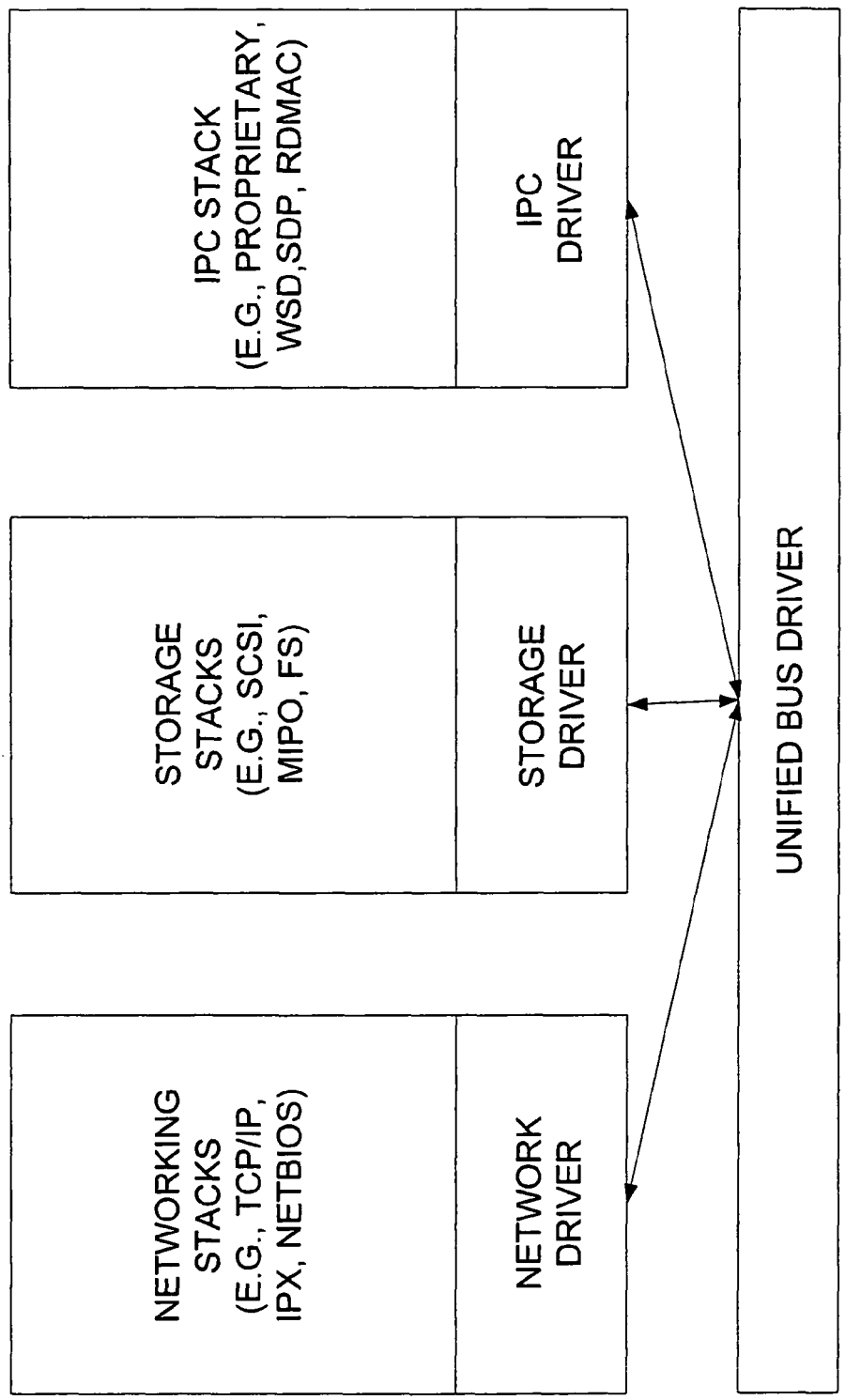
FIG. 14 shows a stack diagram of an embodiment of an operating system with a unified bus driver according to some aspects of the present invention.

FIG. 14 shows a block diagram of an embodiment of an operating system with a unified bus driver according to some aspects of the present invention. The unified bus driver may be the exclusive owner of the network interface hardware and may provide virtualization, for example, by multiplexing outbound traffic from client drivers and de-multiplexing inbound traffic to client drivers. The unified bus driver may provide manageability by providing one or more of the following services: allowing ad-hoc and dynamic registration and de-registration of software stacks and gracefully handling specific software stack tasks (e.g., reset operations) without interrupting other stacks. For example, a networking stack may request a reset and the unified bus driver may perform the network client specific reset without affecting other software stacks. In another example, a networking stack may request a promiscuous mode while other stacks may request a non-promiscuous mode. The unified bus driver may further provide manageability, for example, by providing plug-n-play services from hardware. Client drivers can be enumerated in a manner similar to PCI bus systems or USB bus systems. The unified bus driver may provide manageability, for example, by arbitrating power management requests to support power state transitions.

The unified bus driver may provide, for example, partitioning and/or provisioning. With respect to hardware partitioning, the unified bus driver may partition hardware resources to an atomic granularity and may grant a client driver exclusive access for a specific duration. The client driver may then bypass the unified bus driver after the grant. The revocation of ownership can be initiated by either the unified bus driver or client driver. The unified bus driver may provide provisioning, for example, by implementing a sharing policy, ensuring fairness, and enforcing the different requirements and policies of the different stacks.

Some embodiments according to some aspects of the present invention provide one or more client drivers that provide, for example, one or more of the following services including: continuing to handle stack specific functions on the upper edge; funneling traffic to and from the unified bus driver at the lower edge; and carrying out performance sensitive operations by exclusively accessing hardware partitioning. In some embodiments according to some aspects of the present invention, the traditional device initialization may be replaced by registration with the unified bus driver.

The unified bus driver and client drivers may be, at times, substantially complicated. Accordingly, it may be advantageous for the unified bus driver and the client drivers to be certified by rigorous testing processes imposed by the OS, system vendors and independent testing labs. The unified bus driver may be constructed with an underlying hardware in mind. With hardware partitioning, a single unified bus driver may be capable of supporting many types of client drivers. The single unified bus driver may be adapted to be forward compatible.

Client drivers may be tightly coupled to the software stacks. Thus, in some cases, the hardware may expose a SCSI CDB interface and the client driver may request SCSI commands. The client driver may then be independent of the transport (e.g., FC, SCSI or iSCSI). In other cases, the hardware may expose network-like interfaces (e.g., FC or iSCSI) and the client driver may be responsible for implementing all or part of the protocol.

Heterogeneous Service Delivery System in Unified Network

Figure 15:
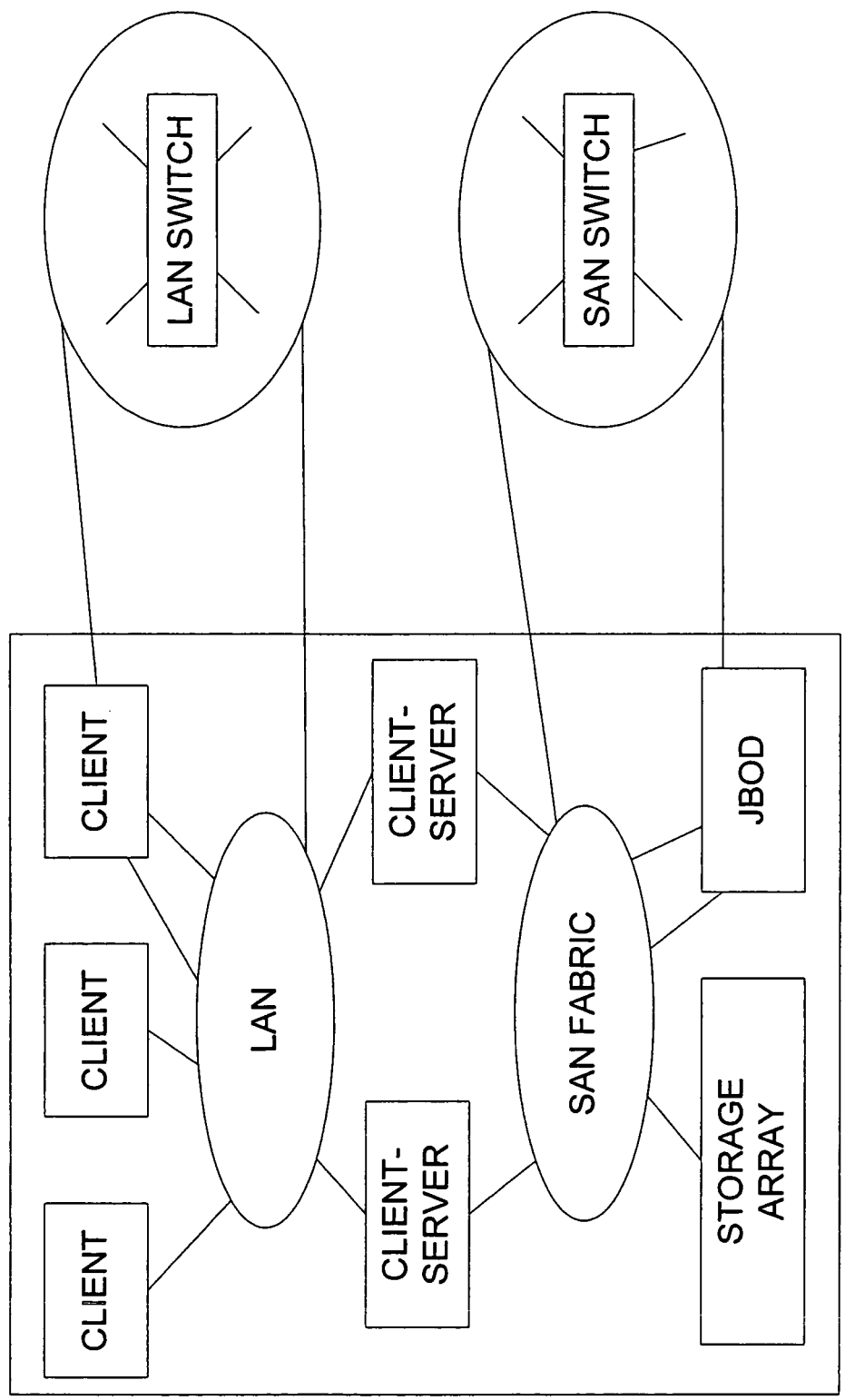
FIG. 15 shows a traditional network architecture.

FIG. 15 shows a traditional network architecture. In the illustrated network architecture, two types of traffic are shown: LAN traffic and SAN traffic. The LAN fabric and the SAN fabric are separate and each fabric has its own switch.

Some embodiments according to some aspects of the present invention provide a unified network that includes, for example, a server blade architecture that unifies traditional architectures that support different protocols within a single server enclosure. Although many of the examples described herein will refer to client LANs and storage Sans, some embodiments according to some aspects of the present invention contemplate applying the unified network with respect to other network types. Furthermore, although many of the examples described herein will refer to Fibre Channel as the SAN transport protocol and to SCSI-3 as the storage protocol, some embodiments according to some aspects of the present invention contemplate applying the unified network to other protocols. In some embodiments according to some aspects of the present invention, although the unified network may provide reduce costs, some of the SAN transport protocol and storage protocol within the blade server architecture may be rearranged in some cases.

Some embodiments according to some aspects of the present invention provide distributed SCSI transport services. In some embodiments according to some aspects of the present invention, the unified network provides, for example, a control proxy element and an end point and distributes storage and SAN transport intelligence. A traditional FC HBA has no concept of a control proxy element. The control proxy element may be provided, for example, as part of a combined LAN/Storage Switch and/or as part of a shared blade server. Some embodiments according to some aspects of the present invention provide for the distribution of the storage and SAN protocol intelligence between the control proxy element and the end point.

In some embodiments according to some aspects of the present invention, distributed storage and SAN transport are provided. For example, if the SAN uses Fibre Channel and related protocols, then there may be at least three ways to distribute storage (e.g., SCSI-3, FCP and FC-2) protocol intelligence within the server blade architecture. Some of the possible ways in which to distribute the SCSI-3, FCP and FC-2 protocol intelligence include, for example, SCSI-3 at the end point and FCP/FC-2 at the control proxy element; SCSI-3/FCP at the end point and FC-2 at the control proxy element; and SCSI-3/FCP/FC-2 at the end point and a minimal function control proxy element. There may be at least two ways in which to locate the control proxy element. Some of the possible ways include, for example, at a combined LAN/SAN switch or at a shared blade. In this example, there are thus at least six different ways to distribute the service delivery systems (SDSes) in heterogeneous networks in a blade server architecture employing a unified network.

Some of the at least six different ways to distribute SDSes include, for example: (1) SCSI-3 at the end point and FCP/FC-2 at the control proxy element (e.g., at the switch); (2) SCSI-3/FCP at the end point and FC-2 at the control proxy element (e.g., at the switch); (3) SCSI-3/FCP/FC-2 at the end point and a minimal function control proxy element (e.g., at the switch); (4) SCSI-3 at the end point and FCP/FC-2 at the control proxy element (e.g., at the shared blade); (5) SCSI-3/FCP at the end point and FC-2 at the control proxy element (e.g., at the shared blade); and (6) SCSI-3/FCP/FC-2 at the end point and minimal function control proxy element (e.g., at the shared blade). The six methods are summarized in FIG. 16 and may be referenced herein by number.

Figure 17:
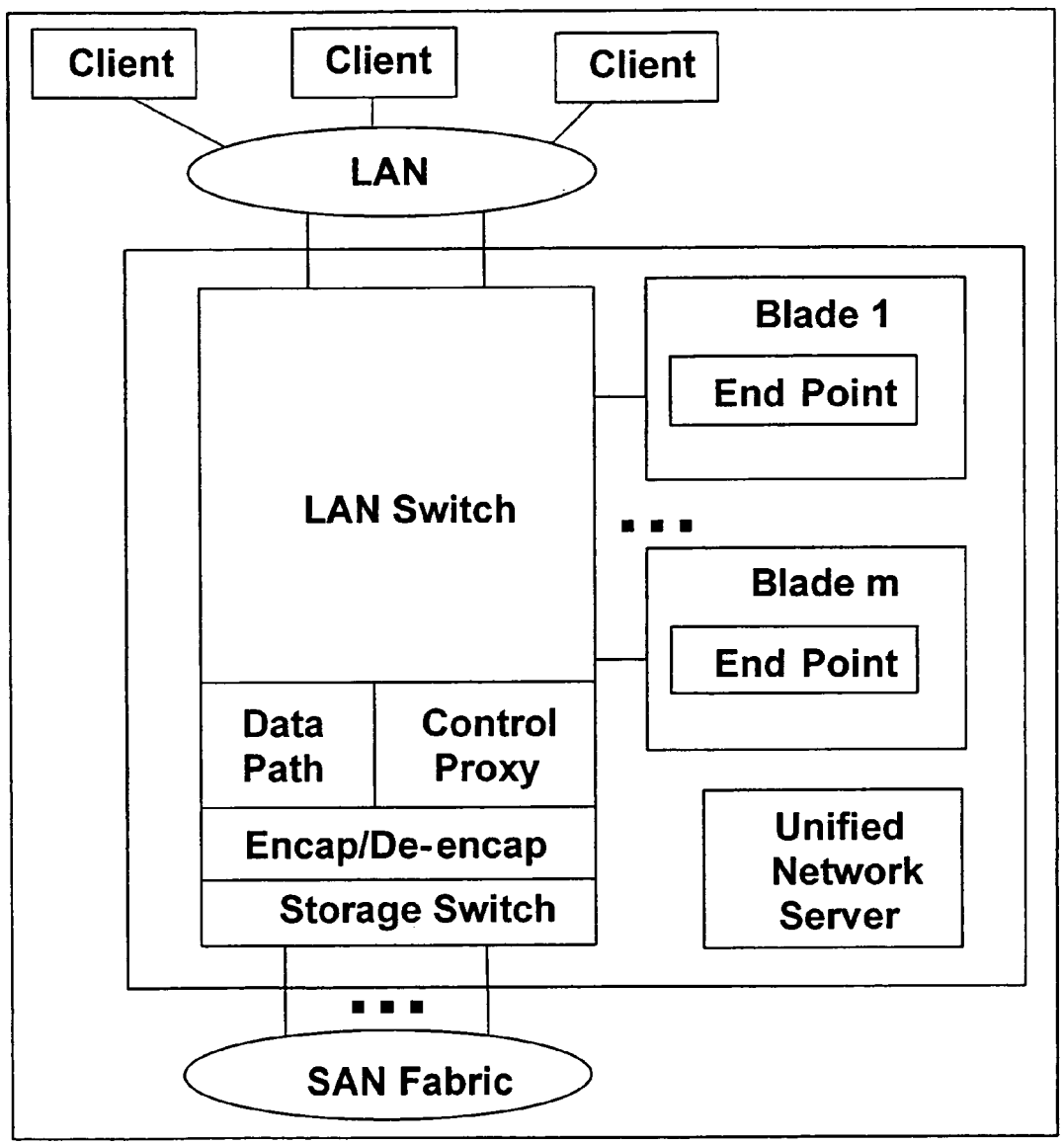
FIG. 17 shows a block diagram illustrating an embodiment of a control proxy element inside a switch according to some aspects of the present invention.

FIG. 17 shows a block diagram illustrating an embodiment of a control proxy element inside a LAN/storage switch according to some aspects of the present invention. Some embodiments according to some aspects of the present invention provide that the control proxy element be co-located within a combined LAN/SAN switch. Some embodiments according to some aspects of the present invention provide higher performance, for example, by separating data and control paths. In some embodiments according to some aspects of the present invention, the SAN fabric uses the FC protocol.

Figure 18:
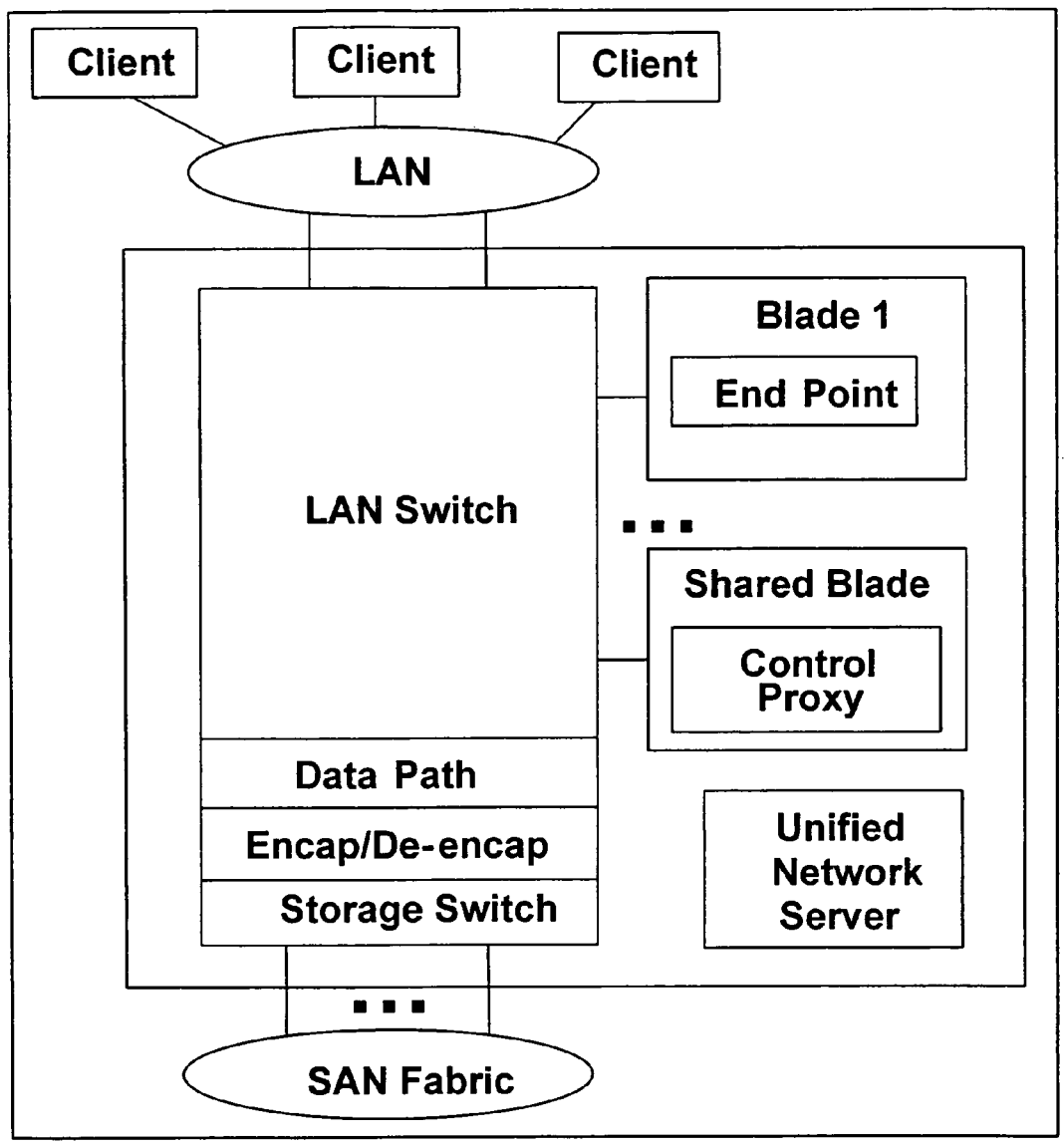
FIG. 18 shows a block diagram illustrating an embodiment of a control proxy element inside a server according to some aspects of the present invention.

FIG. 18 shows a block diagram illustrating an embodiment of a control proxy element inside a shared blade server according to some aspects of the present invention. In some embodiments according to some aspects of the present invention, the control proxy is located in a separate common and shared blade. In some embodiments according to some aspects of the present invention, the SAN fabric uses the FC protocol.

Figure 19:
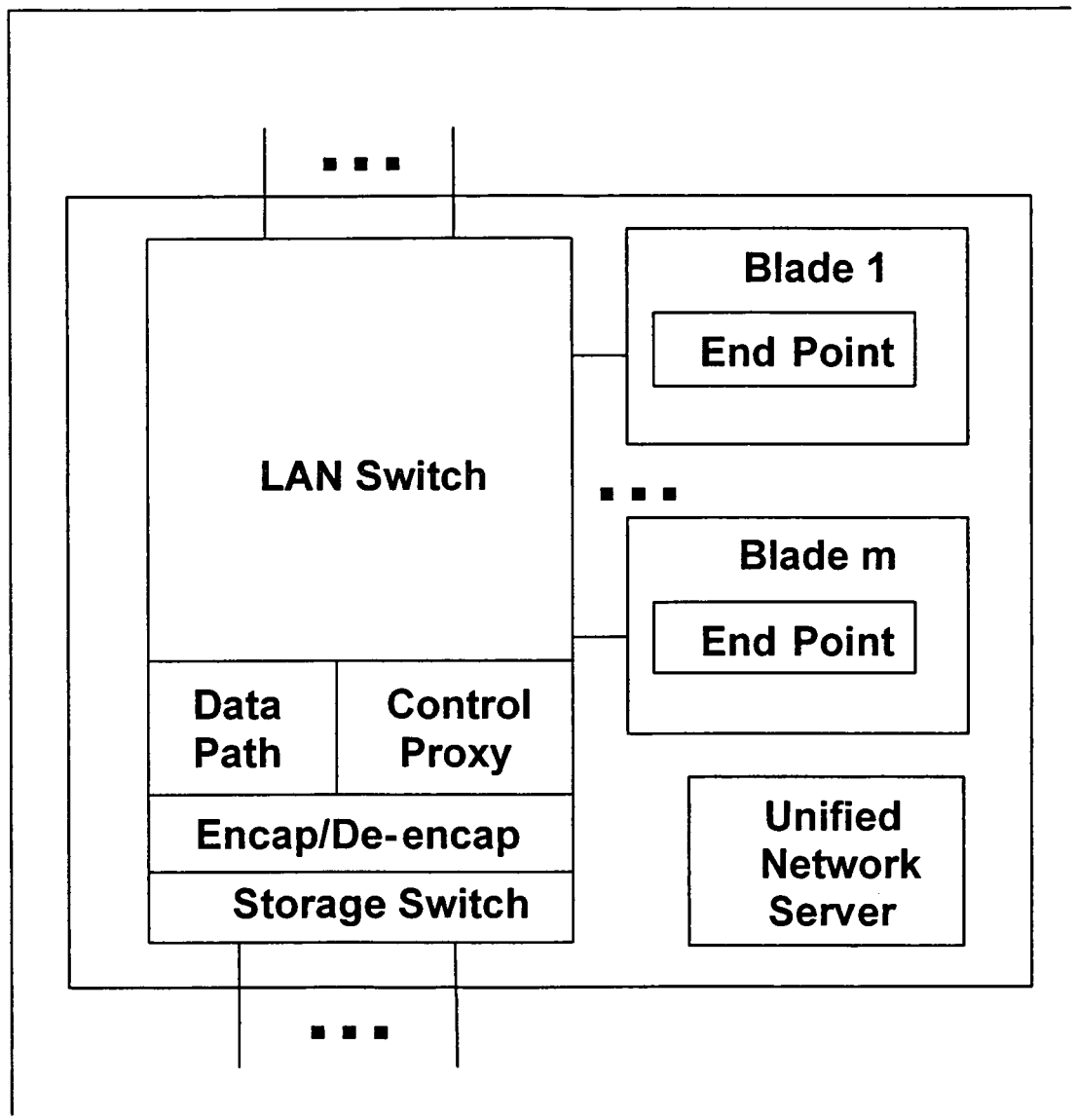
FIG. 19 shows a block diagram illustrates an embodiment of a control proxy element inside a switch according to some aspects of the present invention.

Three of the above-described six different ways to distribute the service delivery systems can be described with respect to FIG. 19 which illustrates an embodiment of a control proxy element inside a LAN/storage switch according to some aspects of the present invention. In some embodiments according to some aspects of the present invention, the control proxy element is located in the combined LAN/SAN switch and the SCSI-3 protocol is located at each end point. Depending on the particular exemplary method, the FCP and/or FC-2 can reside at the control proxy element. Relating to three of the exemplary methods, some possible configurations include, for example: FCP/FC-2 at the control proxy element; FC-2 at the control proxy element and FCP at the end point; and FCP/FC-2 at the end point. The end point and the control proxy element communicate with SCSI-3 information or FCP information or FC-Frame encapsulated in Ethernet frames.

Figure 20:
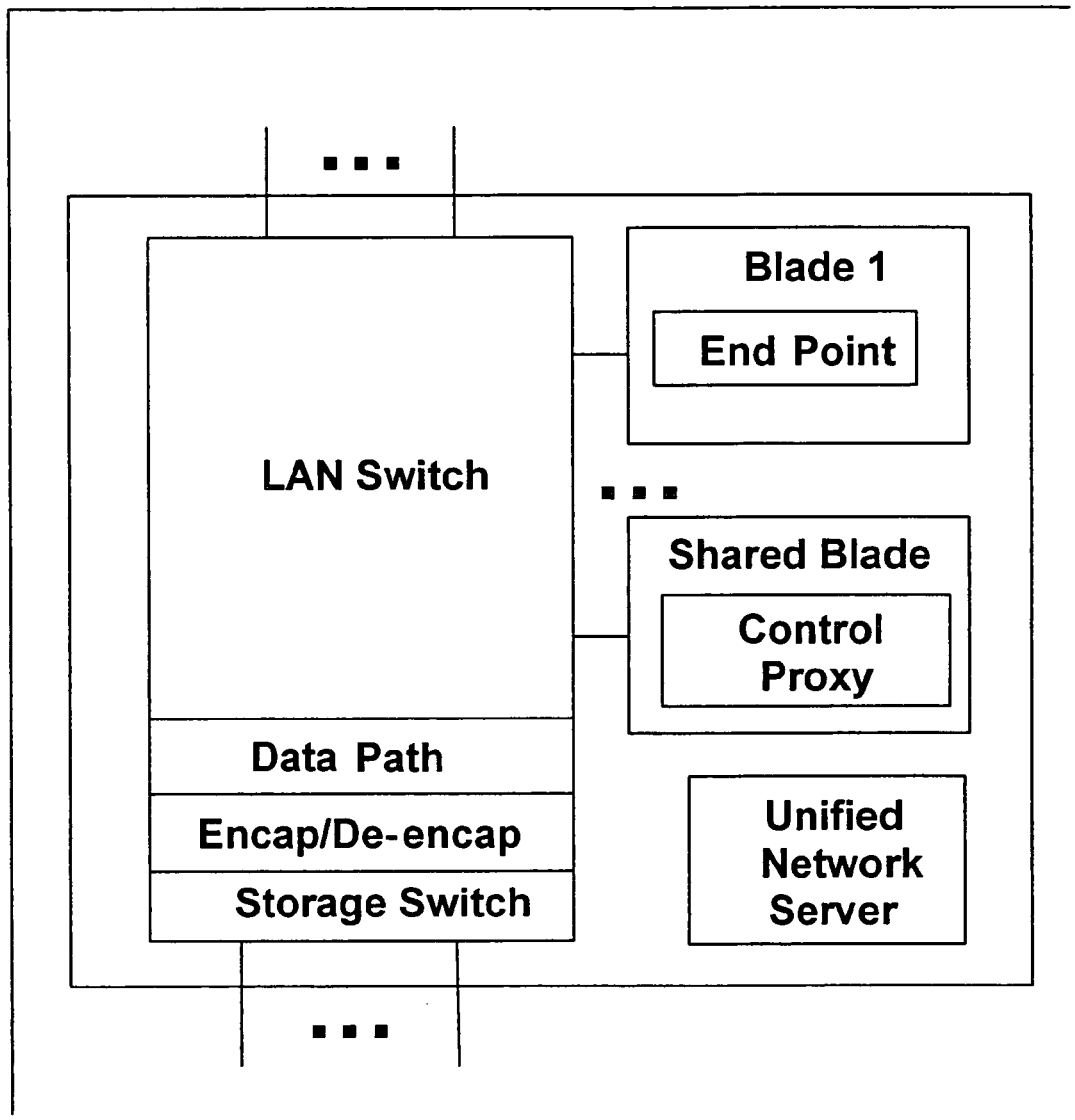
FIG. 20 shows a block diagram illustrating an embodiment of a control proxy element inside a server according to some aspects of the present invention.

Three of the above-described six different ways to distribute the service delivery systems can be described with respect to FIG. 20 which illustrates an embodiment of a control proxy element inside a shared blade according to some aspects of the present invention. In some embodiments according to some aspects of the present invention, the control proxy element is located in the shared blade. The SCSI-3 protocol is located at each end point. Depending on the particular exemplary method, the FCP and/or FC-2 can reside at the control proxy element. Relating to three of the exemplary methods, some possible configurations include, for example: FCP/FC-2 at the control proxy element; FC-2 at the control proxy element and FCP at the end point; and FCP/FC-2 at the end point. The end point and the control proxy element communicate with SCSI-3 information or FCP information or Fibre Channel frames encapsulated in Ethernet frames.

Figure 21:
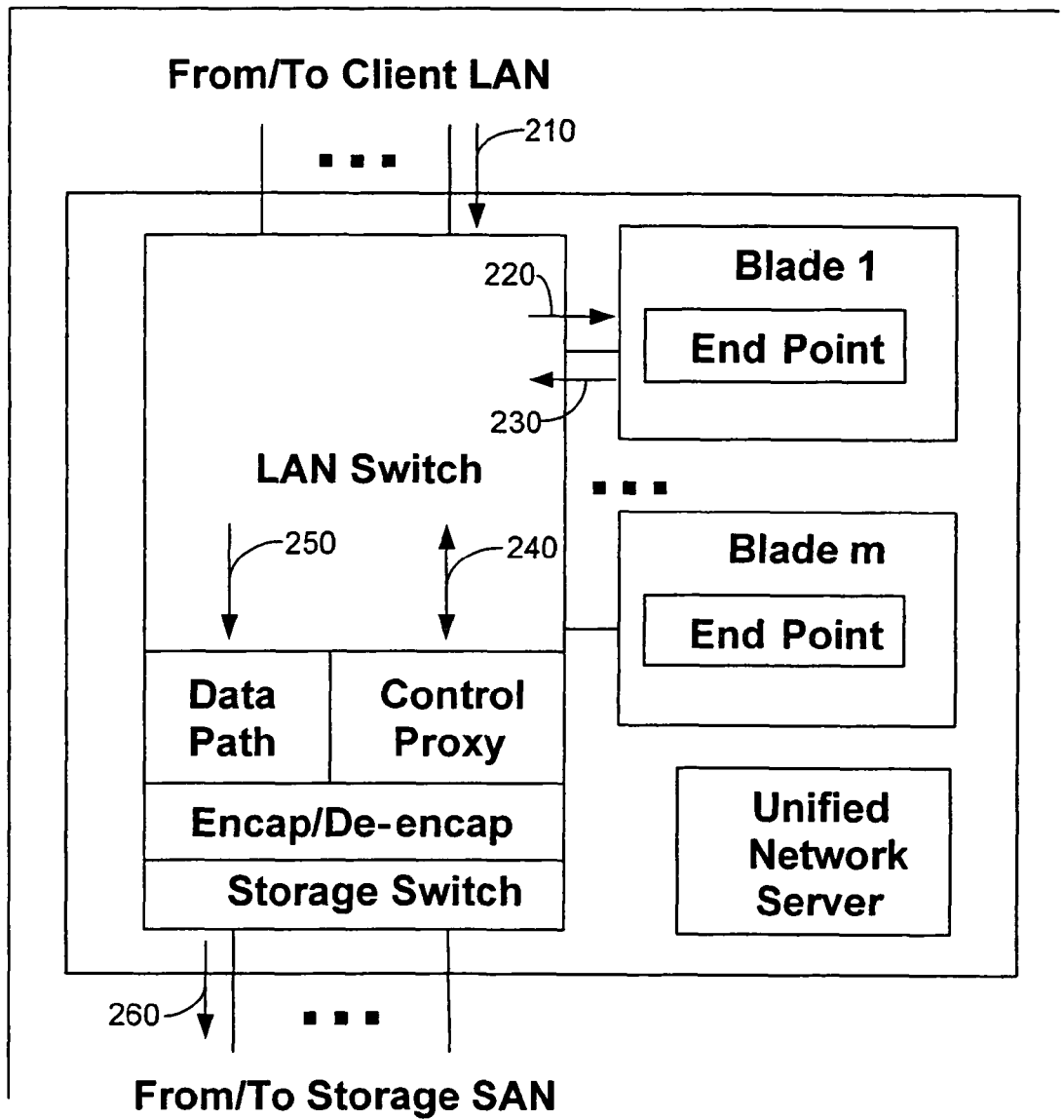
FIG. 21 shows a block diagram illustrating the operation of an embodiment of a service delivery system in a unified network according to some aspects of the present invention.

FIG. 21 shows a block diagram illustrating the operation of an embodiment of a service delivery system in a unified network according to some aspects of the present invention. In step 210, client traffic on Ethernet may be received by the combined LAN/SAN switch. In step 220, client traffic may then be routed to an appropriate blade NIC on Ethernet. In step 230, the end point may then communicate with the control proxy element to obtain an FC Header control stencil on Ethernet. In step 240, the control proxy element then may send the control stencil to end point requesting the stencil on Ethernet. In step 250, the end point may send client data on the data path to the storage switch. The data may be FC data encapsulated on Ethernet. The encapsulation/de-encapsulation function may strip the Ethernet header and, in step 260, may generate and send out, via a storage switch, an FC frame on FC to the SAN Network.

Figure 22:
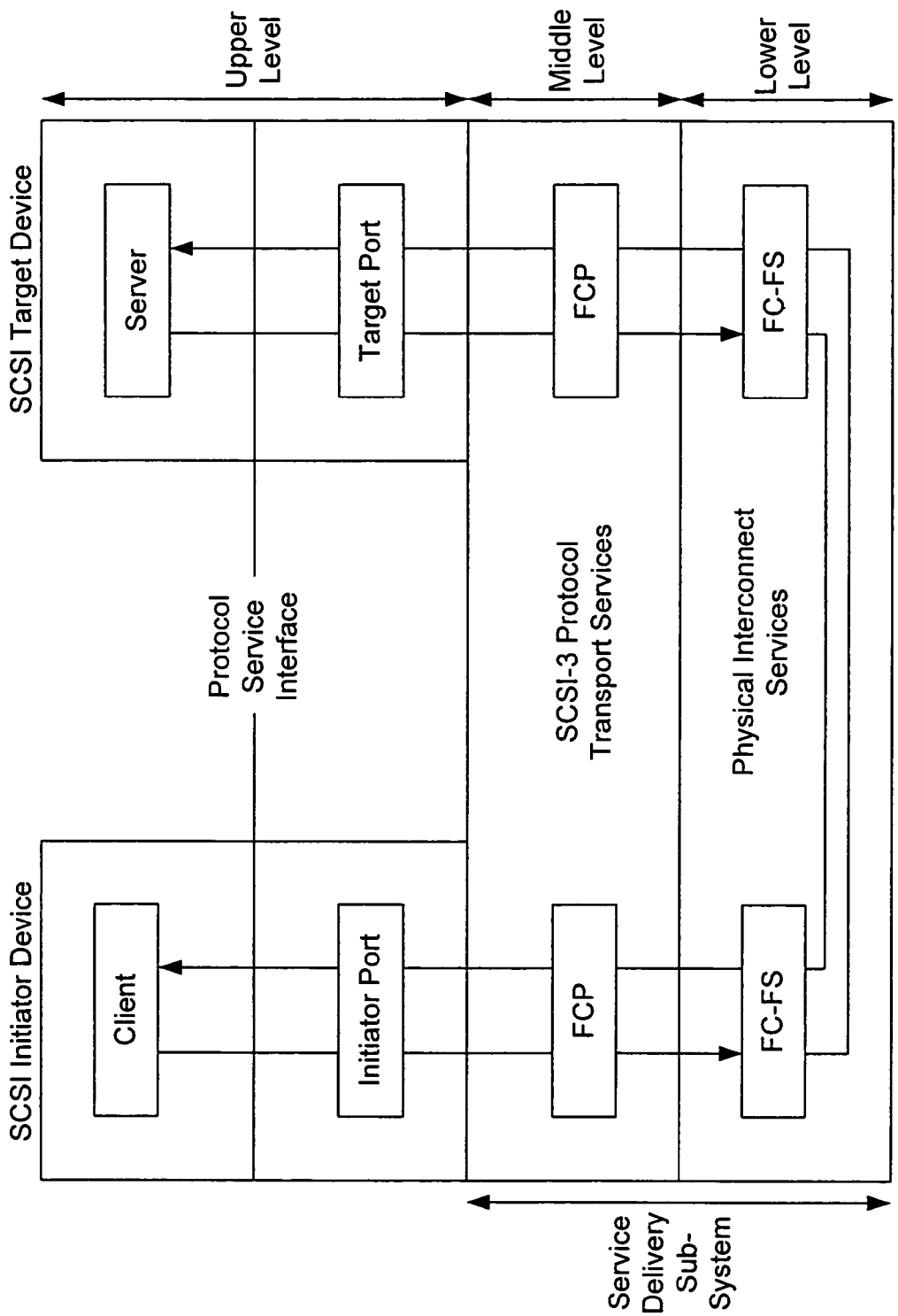
FIG. 22 shows a block diagram illustrating an embodiment of a SCSI model with an FC service delivery system according to some aspects of the present invention.

FIG. 22 shows a block diagram illustrating an embodiment of a SCSI model with an FC service delivery system according to some aspects of the present invention. The upper level may include, for example, the client and initiator port of a SCSI initiator device and a server and a target port of a SCSI target device. The middle level may include, for example, SCSI-3 protocol transport services which might be based on, for example, FCP. The lower level may include, for example, the physical interconnect services which might be based on, for example, FC-FS. The service delivery subsystem may include, for example, the middle level and the lower level.

Figure 23:
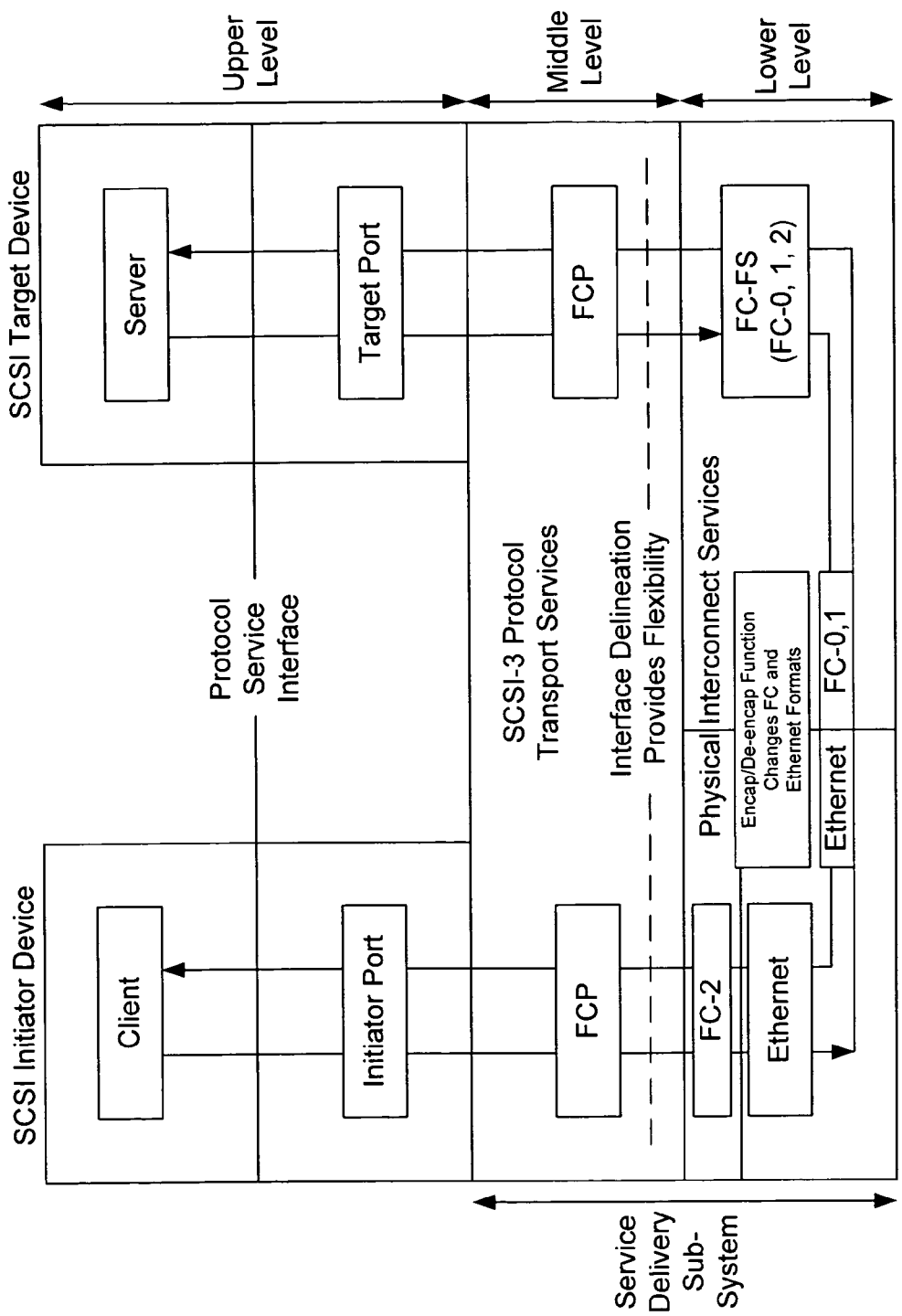
FIG. 23 shows a block diagram illustrating an embodiment of a heterogeneous service distribution system according to some aspects of the present invention.

FIG. 23 shows a block diagram illustrating an embodiment of a heterogeneous service distribution system according to some aspects of the present invention. The heterogeneous service distribution system may be applicable, for example, with method (1) through method (6) as described above. The upper level may include, for example, the client and initiator port of a SCSI initiator device and a server and a target port of a SCSI target device. The middle level may include, for example, SCSI-3 protocol transport services which might be based on, for example, FCP. The lower level may include, for example, the physical interconnect services which might be based on, for example, FC-2 and Ethernet on the initiator side and FC-FS (e.g., FC-0, FC-1 and FC-2) on the target side. The service delivery subsystem may include, for example, the middle level and the lower level.

Figure 24:
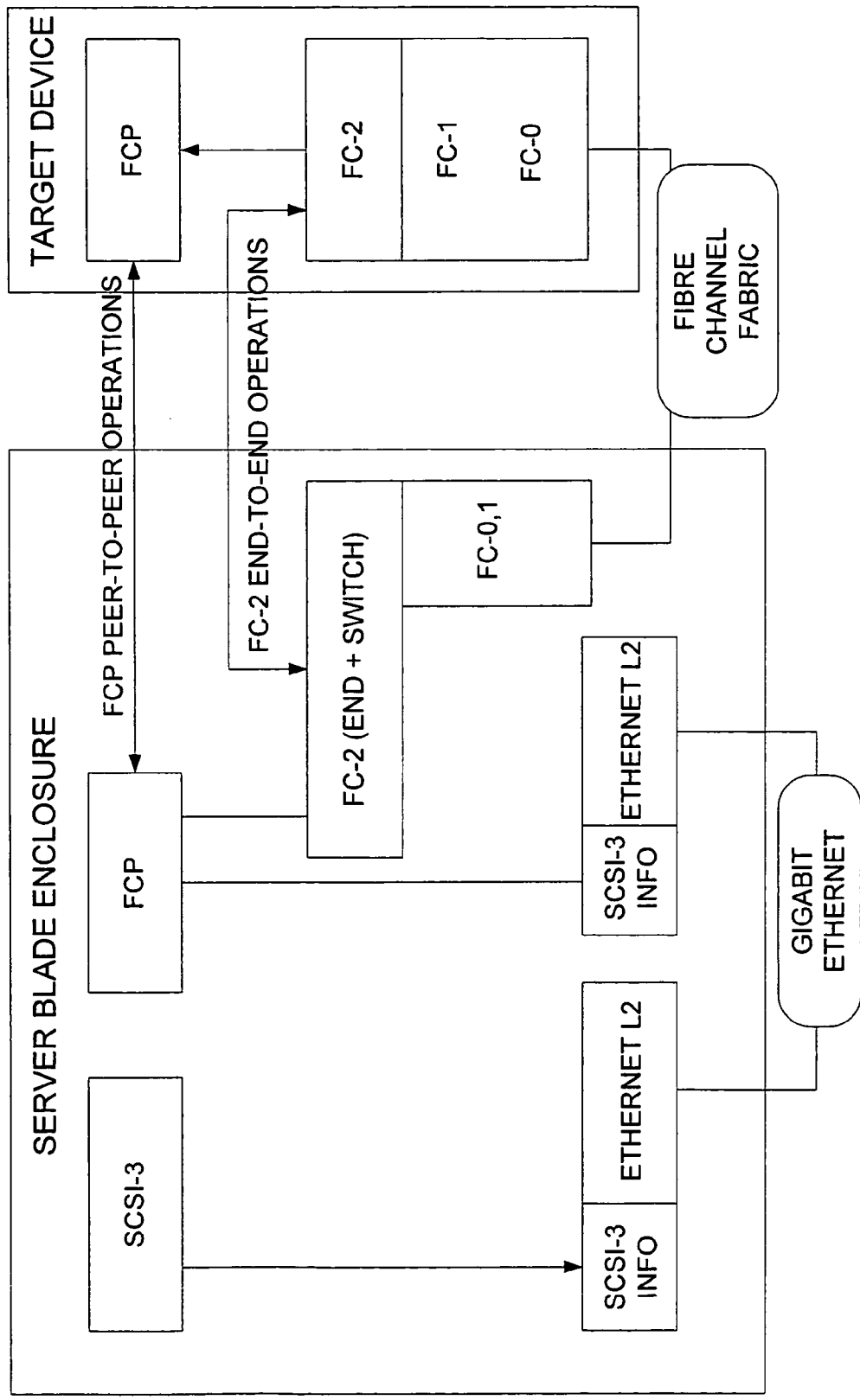
FIG. 24 shows a block diagram illustrating an embodiment of a unified network according to some aspects of the present invention.

FIG. 24 shows a block diagram illustrating an embodiment of a unified network according to some aspects of the present invention. The unified network may be applicable, for example, with method (1) and method (4). Within the server blade enclosure, SCSI-3 information may be encapsulated as one or more Ethernet frames and sent over, for example, a Gigabit Ethernet within the server blade enclosure. The SCSI-3 information may be removed from the Ethernet frame or frames and encapsulated into an FC frame that may include, for example, an FC-2 header and an FC-0, 1 header. The FC frame may then be sent to a target device on FC fabric.

Figure 25:
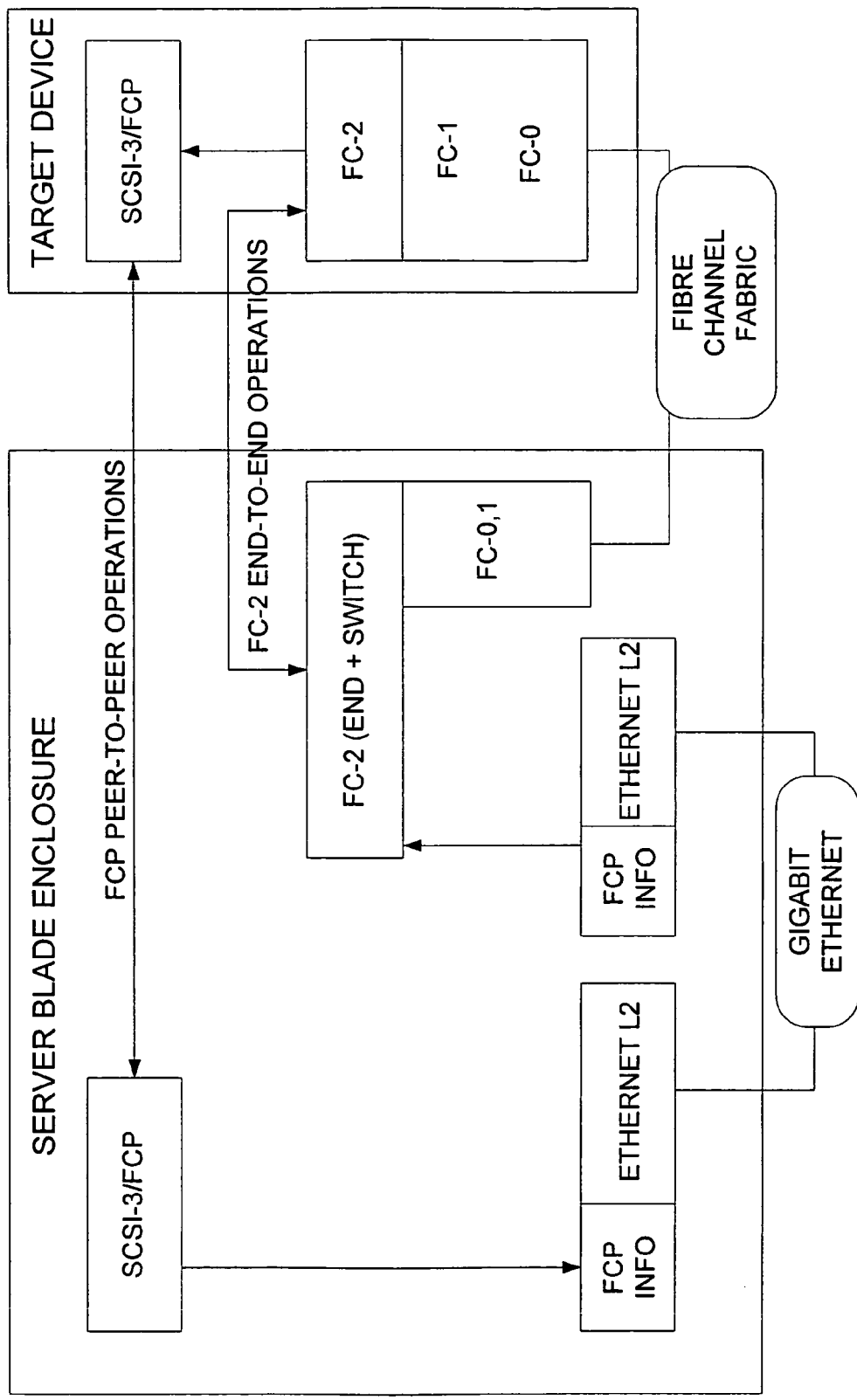
FIG. 25 shows a block diagram illustrating an embodiment of a unified network according to some aspects of the present invention.

FIG. 25 shows a block diagram illustrating an embodiment of a unified network according to some aspects of the present invention. The unified network may be applicable, for example, with method (2) and method (5). Within the server blade enclosure, FCP information may be encapsulated as one or more Ethernet frames and sent over, for example, a Gigabit Ethernet within the server blade enclosure. The FCP information may be removed from the Ethernet frame or frames and encapsulated into an FC frame that may include, for example, an FC-2 header and an FC-0, 1 header. The FC frame may then be sent to a target device on FC fabric. FCP peer-to-peer operations occur between FCP layers of the server blade enclosure and the target device.

Figure 26:
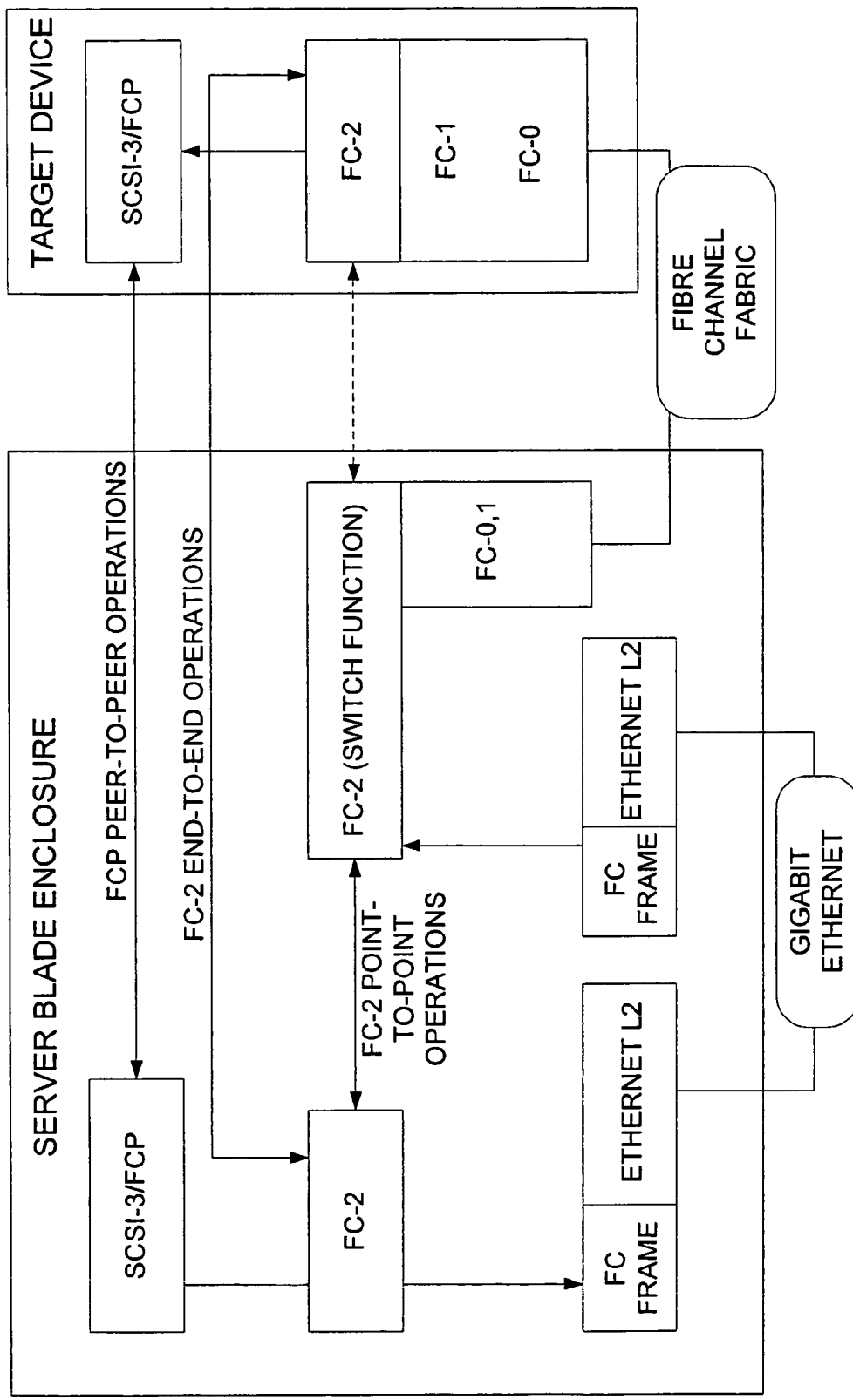
FIG. 26 shows a block diagram illustrating an embodiment of a unified network according to some aspects of the present invention.

FIG. 26 shows a block diagram illustrating an embodiment of a unified network according to some aspects of the present invention. The unified network may be applicable, for example, with method (3) and method (6). Within the server blade enclosure, FC frames may be encapsulated as one or more Ethernet frames and sent over, for example, a Gigabit Ethernet within the server blade enclosure. The FC frame may be removed from the Ethernet frame or frames and may be sent via the FC-2 and FC-0, 1 layers to a target device on FC fabric. FCP peer-to-peer operations occur between SCSI-3/FCP layers of the server blade enclosure and the target device. FC-2 end-to-end operations occur between FC-2 layers of the server blade enclosure and the target device. FC-2 point-to-point operations occur within the server blade enclosure.

Figure 27:
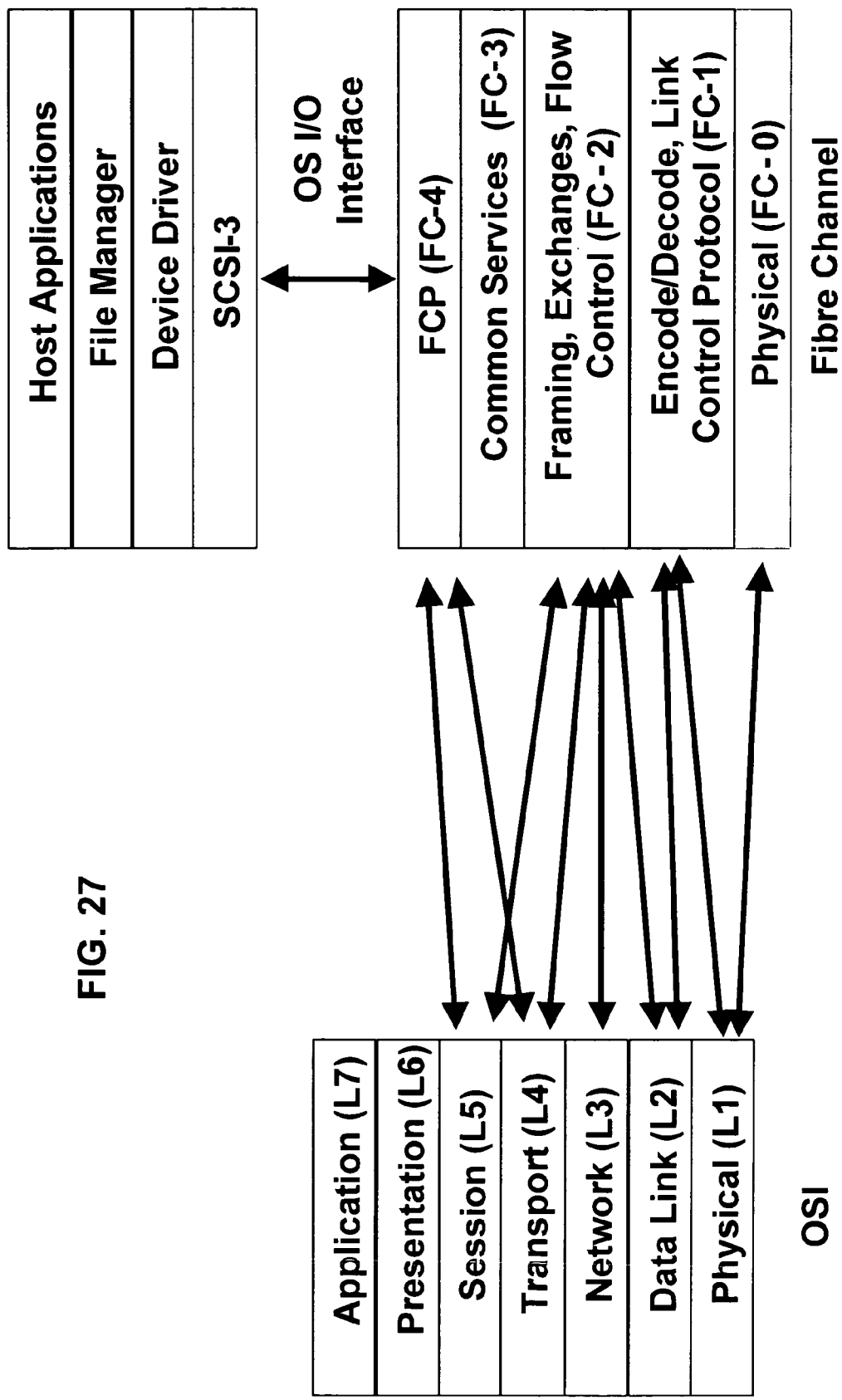
FIG. 27 shows an OSI protocol stack and a Fibre Channel protocol stack according to some embodiments in accordance with some aspects of the present invention.

FIG. 27 shows an OSI protocol stack and a Fibre Channel protocol stack according to some embodiments in accordance with some aspects of the present invention. The protocol stacks illustrate how some of the FC protocol stack layers correspond to some of the OSI protocol stack layers.

Figure 28:
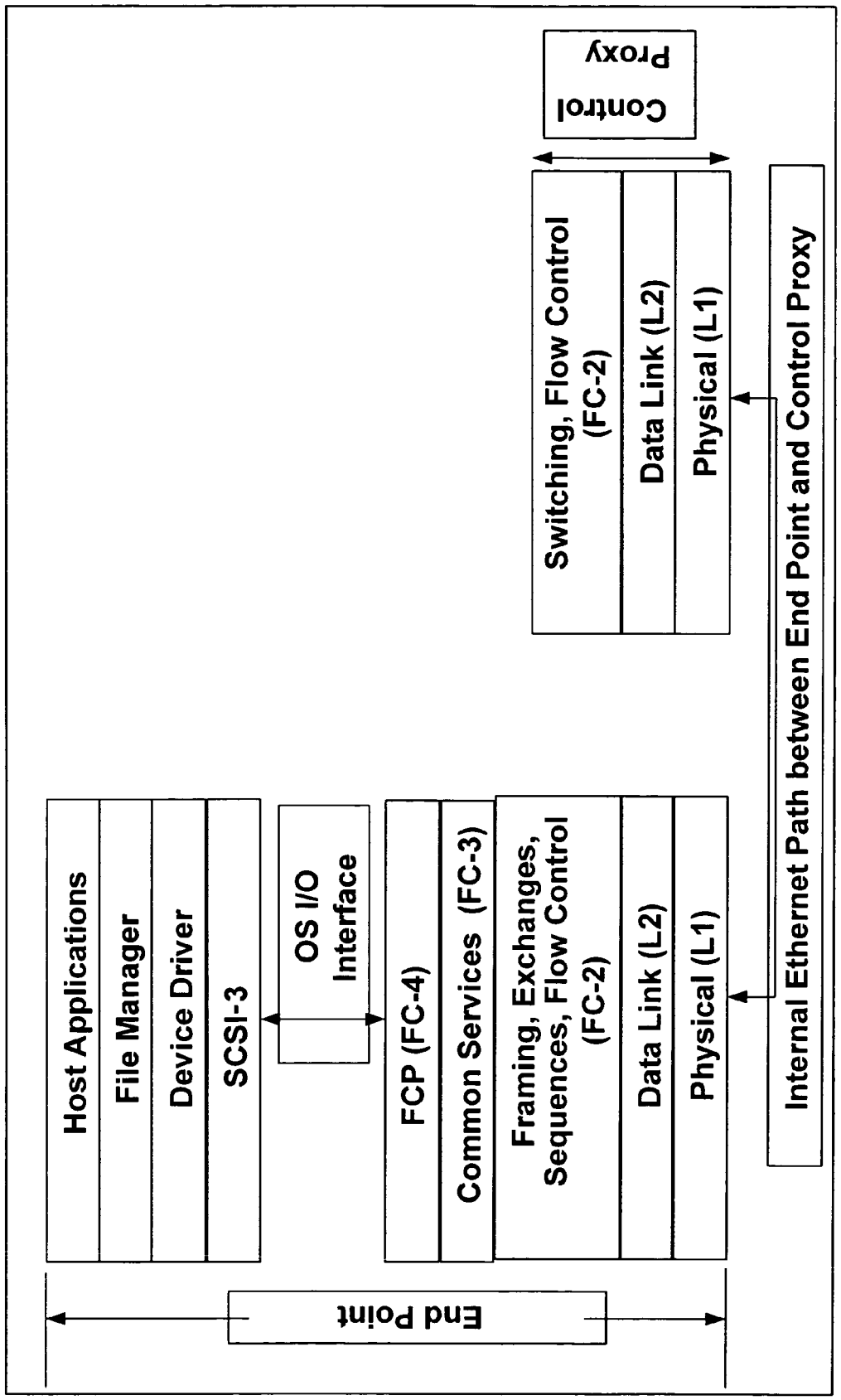
FIG. 28 shows embodiments of protocol stacks of an end point and a control proxy element according to some aspects of the present invention.

FIG. 28 shows embodiments of protocol stacks of an end point and a control proxy element according to some aspects of the present invention. The unified network may be applicable, for example, with method (3) and method (6). In some embodiments according to some aspects of the present invention, the end point can send FC-ready frames on Ethernet by encapsulating the FC-ready frame with Ethernet headers. The control proxy element can strip the Ethernet headers with only the FC-ready frame remaining. The control proxy element can then send the FC-ready frame on FC fabric.

Figure 29:
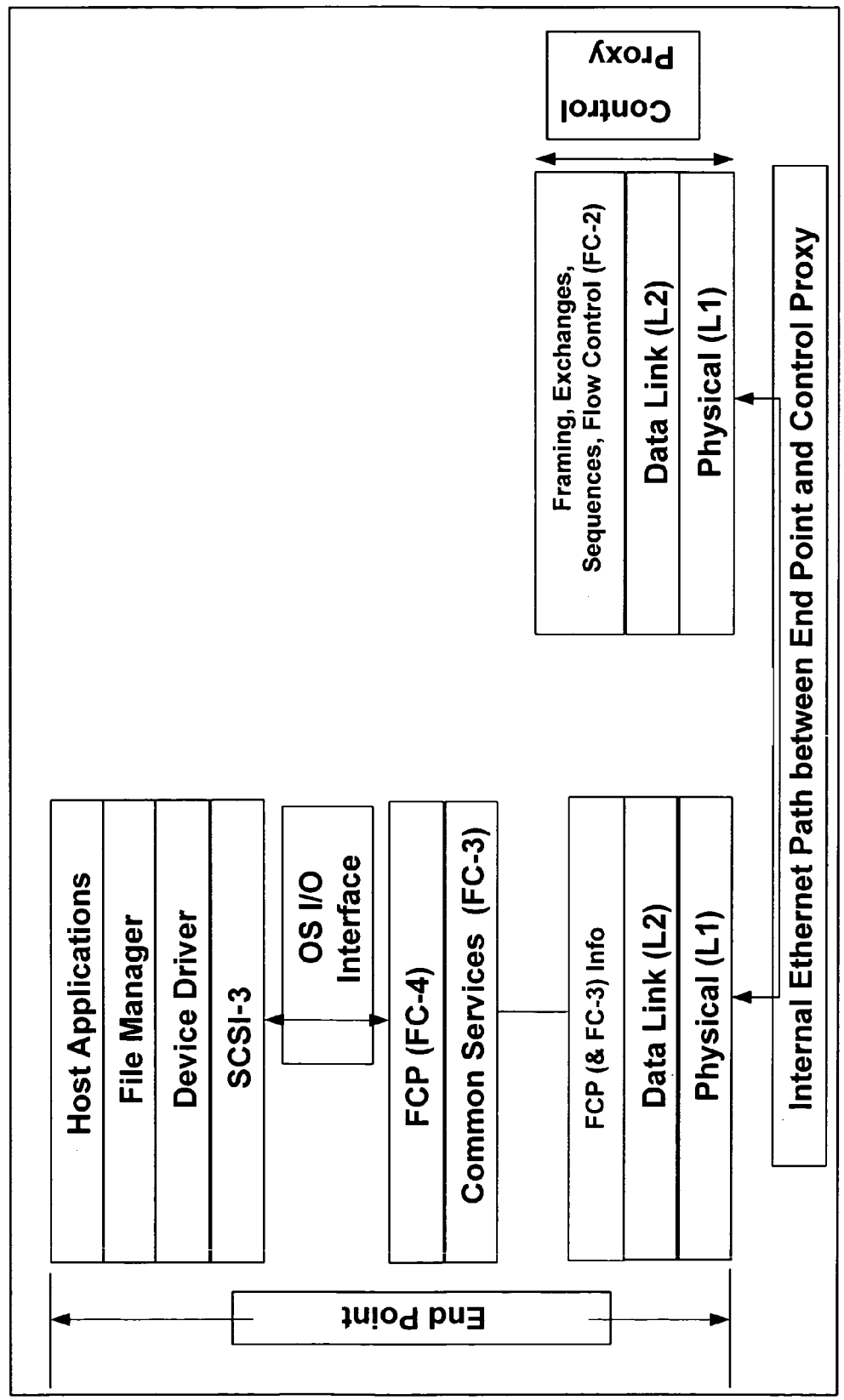
FIG. 29 shows embodiments of protocol stacks of an end point and a control proxy element according to some aspects of the present invention.

FIG. 29 shows embodiments of protocol stacks of an end point and a control proxy element according to some aspects of the present invention. The unified network may be applicable, for example, with method (2) and method (5). In some embodiments according to some aspects of the present invention, the end point can send FC information on Ethernet by encapsulating the FC-ready frame with Ethernet headers. The control proxy element can strip the Ethernet headers with only the FC information remaining. The control proxy element can then generate an FC frame for the FC information and send the FC frame on FC fabric.

FC header bits at the last mile are now described. An FC-2 level at a local peer may communicate with an FC-2 level of a far-end peer by encoding bits in the FC Header. The communication may relate, for example, to FC Exchanges and Sequences. At the FC-2 end node, one or more of the following operations are performed, including: managing exchanges and sequences by maintaining their respective status blocks; manages sessions (e.g., login and logout); handling link control; managing flow control and credits; and choosing an appropriate class of service. The start-of-frame (SOF) and end-of-frame (EOF) fields may carry, for example, sequence information and/or sequence phase information. Some embodiments according to some aspects of the present invention provide that the above-described FC-2 header bits be preserved no matter where the FC-2 level resides (e.g., at the end point or at the control proxy element).

Figure 30:
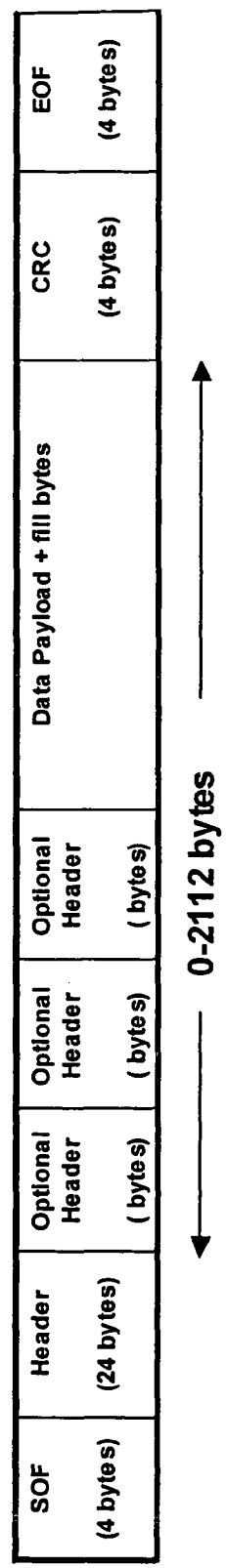
FIG. 30 shows an embodiment of a Fibre-Channel-2 (FC-2) frame according to some aspects of the present invention.

FIG. 30 shows an embodiment of an FC-2 frame according to some aspects of the present invention. Each FC-2 frame may begin with an SOF field and end with an EOF delimiter which are each four bytes. The FC-2 frame may also include a fixed header of twenty-four bytes and may include a data field of between zero and 2112 bytes. The frame may also include, for example, up to three optional headers and may include, for example, a four-byte CRC field. The FC header TYPE field may carry, for example, proprietary control information with appropriate encoding to indicate "vendor unique" information for communication between the end point and the control proxy element.

FIG. 31 shows an embodiment of an FC-2 Fibre Channel frame header according to some aspects of the present invention. The FC-2 Fibre Channel frame header TYPE field may include, for example, proprietary control information with appropriate encoding to indicate "vender unique" information for communication between the end point and the control proxy element. Some fields shown in FIG. 31 include the following: routing control R_CTL; class specific control CS_CTL; frame control F_CTL; data field control DF_CTL; data type field TYPE; sequence count SEQ_CNT; sequence identifier SEQ_ID; originator identifier OX_ID; responder identifier RX_ID; and parameter field PARM.

Some embodiments according to some aspects of the present invention provide for one or more of the following SCSI-3 and/or FC-4 (FCP) parameters as set forth below.

Some embodiments according to some aspects of the present invention provide for FC-4 (FCP) IU data category mapping into a FC-2 level payload. For FC header R_CTL <Word 0, bits 27:24>:FCP_CMN 6; FCP_XFER_RDY IC=5; FCP_DATA IC=1; and FCP_RSP IC=7.

In some embodiments according to some aspects of the present invention, other SCSI-3 parameters may include, for example, one or more of the following: task attributes (e.g., simple queue, ordered queue, etc.), task management (e.g., Clear Task, Reset LUN, etc.), and LUN which are encoded in the Command Descriptor Block which is carried in the FCP_CMND FC-2 Payload); offset and burst length for data transfers which are encoded in the FCP_XFER_RDY FC-2

Payload; SCSI Status and Sense data which is encoded in the FCP_RSP FC-2 payload; FCP_DATA which carries the actual user SCSI Read or Write Data; a command reference number (CRN) FCP field which provides ordering information for commands when the target needs it and which is encoded inside the CDB FC_CMND FC-2 payload; and the SCSI initiator and target identifiers which are encoded as FC WW_Port_Name and WW_Node_Names.

In some embodiments according to some aspects of the present invention, SCSI-3 task identifier parameters may include, for example, one or more of the following: Source_ID (S_ID) <Word 1 bits 23:0> and Destination_ID (D_ID) <Word 0 bits 23:0> fields in the FC Frame Header which are sent to the target (which places its ID in the S_ID field in all frames sent to the initiator) and which identify the initiator and the target; a SCSI task (e.g., an I/O Process) which is mapped into a Fibre Channel Exchange; a 16-bit Originator ID or OX_ID (FC-2 Header <Word 4, bits 31:16>) which identifies each task between an initiator and a target and which FCP requires be unique for each open exchange; a 16-bit Responder ID or RX_ID (FC-2 Header <Word 4, bits 15:0>) assigned by a target to the exchange; LUN which is identified in the FC_CMND CDB and which is bound to the Initiator ID, OX_ID and RX_ID (if generated); and an FC Header TYPE <Word 2 bits 31:24> which indicates FCP payload.

In some embodiments according to some aspects of the present invention, with respect to FC-2 parameters, SCSI request/response primitives are mapped into FC Sequences ID (SEQ_ID) <Word 3, bits 31:24>and a sequence count is maintained (SEQ_CNT) <Word 3, bits 15:0>. FC Header F_CTL <Word 2 bits 31:0> provides indication of sequence control for ACK and Data Frame including, one or more of the following: First, Last, End, Seq. Initiator, Seq. Recipient, Exchange Initiator, Exchange Recipient, Seq. Initiative transferred, Sequence, Continue Sequence, Stop Sequence, etc. FC Header Word 5 bits provides an indication of invalid fields for R_CTL, OX_ID, RX_ID, SEQ_ID, SEQ_CNT and unsupported classes of service.

Some embodiments according to some aspects of the present invention provide one or more the FC-1 parameters as set forth below. With respect to method (1) and method (6) or when FC-2 is at the end point, byte-encoded SOF and EOF information is preserved between the end point and the control proxy element. (FC implementations provide this as a 10-bit code directly at the FC-1 level.) The FC-1 parameter R_RDY buffer-to-buffer primitive signal is encoded into a special L2 control protocol data unit (PDU) for communication between the end point and the control proxy element.

Figure 32:
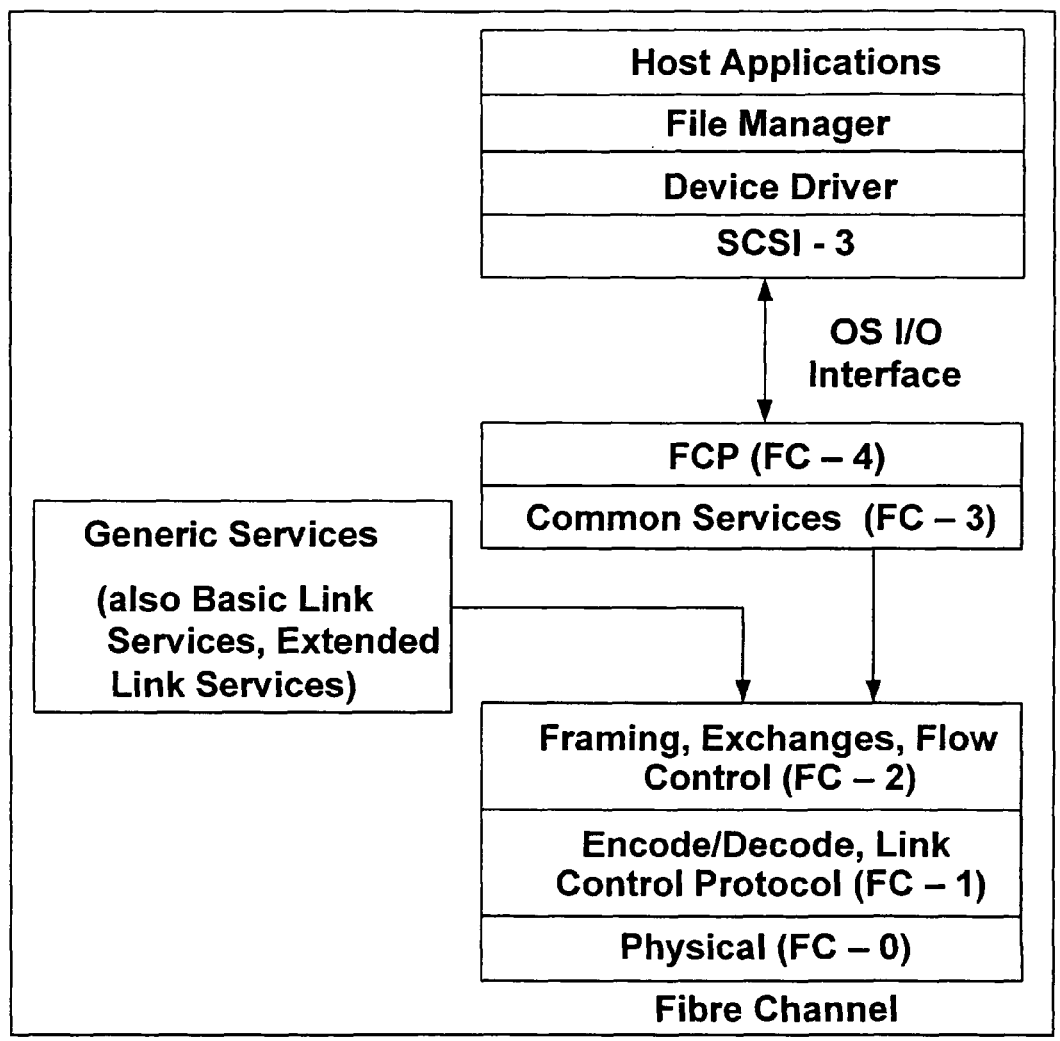
FIG. 32 shows an embodiment of a protocol stack that provides services support according to some aspects of the present invention.

FIG. 32 shows an embodiment of a protocol stack that provides services support according to some aspects of the present invention. In particular, the protocol stack may support methods (1)-(6) in some instances. FC generic services (e.g., Name Server, Management Server, Security Key Distribution Servers, etc.) may occur at a level above the FC-2, although FC generic services are not normally shown in the path of the protocol stack. Some or all Fibre Channel services may be accessed via the end point or the control proxy element. The access point might not be visible to the external FC fabric network.

This application makes reference to the following United States patent applications: U.S. patent application Ser. No. 10/938,156, filed on Sep 10, 2004; U.S. Patent Application Ser. No. 60/501,794, filed on Sep. 10, 2003; U.S. Patent Application Ser. No. 60/507,638, filed on Oct. 1, 2003; U.S. Patent Application Ser. No. 60/527,739, filed on Dec. 8, 2003; U.S. Patent Application Ser. No. 60/431,087 filed Dec. 5, 2002; U.S. patent application Ser. No. 10/727,430 filed Dec. 4, 2003; U.S. Patent Application Ser. No. 60/478,106, filed on Jun. 11, 2003; and U.S. patent application Ser. No. 10/652,330, filed on Aug. 29, 2003. The above-referenced United States patent applications are hereby incorporated herein by reference in their entirety.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method, comprising:
generating, by an end point, a first frame that comprises a proxy payload, a proxy association header and a frame header, the frame header relating to a control proxy element, wherein the end point comprises a kernel driver that configures the control proxy element and that provides a particular level of security from user level applications;
sending, by the end point, the first frame over a first network and through a switch to the control proxy element, wherein the control proxy element and the switch are separate components;
generating, by the control proxy element, a second frame that comprises the proxy payload and a proxy header, the first and second frames corresponding to different layer-2 protocols; and
sending, by the control proxy element, the second frame over a second network employing the layer-2 protocol of the second frame.

2. The method according to claim 1, wherein the end point is part of a unified infrastructure over Ethernet and the second network is external to the unified infrastructure.

3. The method according to claim 1, wherein the control proxy element maintains a portion of control state for communications between the end point and a system employing the layer-2 protocol of the second frame.

4. The method according to claim 1, wherein the control proxy element and the end point share a portion of control state for communications between the end point and a system employing the different layer-2 protocol.

5. The method according to claim 1, wherein the control proxy element forwards an entire control state for communications between the end point and a system employing the layer-2 protocol of the second frame to the end point.

6. The method according to claim 1, wherein the second frame further comprises a proxy footer.

7. The method according to claim 1, wherein the second network comprises a small computer system interface (SCSI) network.

8. The method according to claim 1, wherein the second network comprises a Fibre Channel (FC) network.

9. The method according to claim 1, wherein the second network comprises a remote direct memory access (RDMA) network.

10. The method according to claim 1, wherein the proxy payload comprises at least one of SCSI information and FC information.

11. The method according to claim 1, wherein the frame header relates to a particular port of the control proxy element.

12. The method according to claim 1, further comprising: processing the first frame using context information disposed in the proxy association header.

13. The method according to claim 1, wherein the end point comprises one or more server blades, each server blade comprising one or more network interface cards (NICs).

14. The method according to claim 1, wherein the control proxy element is disposed in a shared server blade.

15. The method according to claim 1,
wherein the end point comprises one or more server blades,
wherein the control proxy element is disposed in a shared server blade, and
wherein the end point and the control proxy element are part of a unified Ethernet-based network.

16. A method, comprising:
receiving, by a control proxy element over a first network, a first frame that comprises a proxy header, a proxy footer and a proxy payload;
generating, by the control proxy element, a second frame that comprises a frame header, a proxy association header and the proxy payload, the frame header relating to an end point, wherein the end point comprises a kernel driver that configures the control proxy element and that provides a particular level of security from user level applications; and
sending, by the control proxy element through a switch that is communicatively disposed between the control proxy element and the end point, the second frame over a second network to the end point, the first and second networks employing different layer-2 protocols, wherein the control proxy element and the switch are separate components.

17. The method according to claim 16, wherein the end point is part of a unified infrastructure over Ethernet and the first network is external to the unified infrastructure.

18. The method according to claim 16, wherein the control proxy element maintains at least some control state for communications between the end point and a system on the first network.

19. The method according to claim 16,
wherein the control proxy element and the end point share some control state for communications between the end point and a system on the first network.

20. The method according to claim 16,
wherein the control proxy element forwards, to the end point, an entire control state for communications between the end point and a system on the first network.

21. The method according to claim 16, wherein the first network comprises at least one of a small computer system interface (SCSI) network or a Fibre Channel (FC) network.

22. The method according to claim 16, wherein the first network comprises a remote direct memory access (RDMA) network.

23. The method according to claim 16, wherein at least one of the proxy header or the proxy footer comprises information relating to a particular port of the control proxy element, the control proxy element being coupled to the end point via the second network.

24. The method according to claim 16, wherein the proxy payload comprises at least one of SCSI information, FC information or RDMA information.

25. The method according to claim 16, wherein the frame header relates to a particular kernel driver in the end point.

26. The method according to claim 16, wherein the end point comprises one or more server blades, each server blade comprising one or more network interface cards (NICs).

27. The method according to claim 16, wherein the control proxy element is disposed in a shared server blade.

28. The method according to claim 16,
wherein the end point comprises one or more server blades,
wherein the control proxy element is disposed in a shared server blade, and
wherein the end point and the control proxy element are part of a unified Ethernet-based network.

29. The method according to claim 28, wherein the unified Ethernet-based network is seen as a non-Ethernet-based entity by the first network.

30. A method, comprising:
generating, by an end point, a first frame that comprises a second frame, a proxy association header and a frame header, the frame header relating to a control proxy element, wherein the end point comprises a kernel driver that configures the control proxy element and that provides a particular level of security from user level applications;
sending, by the end point through a switch that is communicatively disposed between the end point and the control proxy element, the first frame over a first network to the control proxy element, wherein the control proxy element and the switch are separate components; and
sending, by the control proxy element, the second frame over a second network, the first and second networks employing different layer-2 protocols.

31. The method according to claim 30, wherein the end point is part of a unified infrastructure over Ethernet and the second network is external to the unified infrastructure.

32. The method according to claim 30, wherein the control proxy element maintains a portion of control state for communications between the end point and a system on the second network.

33. The method according to claim 30, wherein the control proxy element and the end point share a portion of control state for communications between the end point and a system on the second network.

34. The method according to claim 30, wherein the control proxy element forwards an entire control state for communications between the end point and a system on the second network to the end point.

35. The method according to claim 30, further comprising: removing the second frame from the first frame.

36. The method according to claim 30, wherein the second network comprises a small computer system interface (SCSI) network.

37. The method according to claim 30, wherein the second network comprises a Fibre Channel (FC) network.

38. The method according to claim 30, wherein the second network comprises a remote direct memory access (RDMA) network.

39. The method according to claim 30, wherein the frame header relates to a particular port of the control proxy element.

40. The method according to claim 30, wherein the end point comprises one or more server blades.

41. The method according to claim 30, wherein the control proxy element is disposed in a shared server blade.

42. The method according to claim 30,
wherein the end point comprises one or more server blades,
wherein the control proxy element is disposed in a shared server blade, and wherein the end point and the control proxy element are part of a unified Ethernet-based network.

43. A system, comprising:
an end point that is adapted to generate a first frame that comprises a proxy payload, a proxy association header and a frame header, the frame header relating to a control proxy element;
a switch coupled to the end point; and
a control proxy element coupled to the end point via a first network, the switch being disposed communicatively between the end point and the control proxy element, the control proxy element receiving the generated first frame over the first network and generating a second frame that comprises the proxy payload and a proxy header, the control proxy element sending the second frame over a second network, the first and second networks employing different layer-2 protocols;
wherein the control proxy element and the switch are separate components, and
wherein the end point comprises a kernel driver that configures the control proxy element and that provides a particular level of security from user level applications.

44. The system according to claim 43, wherein the end point is part of a unified infrastructure over Ethernet and the second network is external to the unified infrastructure.

45. The system according to claim 43, wherein the control proxy element maintains a portion of control state for communications between the end point and a system on the second network.

46. The system according to claim 43, wherein the control proxy element and the end point share a portion of control state for communications between the end point and a system on the second network.

47. The system according to claim 43, wherein the control proxy element forwards, to the end point, an entire control state for communications between the end point and a system on the second network.

48. The system according to claim 43, wherein the second network comprises at least one of a small computer system interface (SCSI) network, a Fibre Channel (FC) network or a remote direct memory access (RDMA) network.

49. The system according to claim 43, wherein the proxy payload comprises at least one of SCSI information and FC information.

50. The system according to claim 43, wherein the frame header relates to a particular port of the control proxy element.

51. The system according to claim 43, wherein the end point comprises one or more server blades, each server blade comprising one or more network interface cards (NICs).

52. The system according to claim 43, further comprising:
additional end points coupled to the control proxy element, wherein the control proxy element is disposed in a shared server blade.

53. The system according to claim 43, wherein the end point and the control proxy element are part of a unified Ethernet-based network.

54. A system, comprising:
a control proxy element adapted to receive a first frame that comprises a proxy header, a proxy footer and a proxy payload by way of a first network, the control proxy element being adapted to generate a second frame that comprises a frame header, a proxy association header and the proxy payload, the frame header relating to an end point, the first and second frames corresponding to different layer-2 protocols;
one or more end points coupled to the control proxy element via a second network, the one or more end points adapted to receive the generated second frame over the second network; and
a switch communicatively disposed between the control proxy element and the one or more end points,
wherein the control proxy element and the switch are separate components, and
wherein the end point comprises a kernel driver that configures the control proxy element and that provides a particular level of security from user level applications.

55. The system according to claim 54, wherein the one or more end points are part of a unified infrastructure over Ethernet and the first network is external to the unified infrastructure.

56. The system according to claim 54, wherein the control proxy element maintains a portion of control state for communications between a particular one of the one or more end points and a system on the first network.

57. The system according to claim 54, wherein the control proxy element and a particular one of the one or more end points share a portion of control state for communications between the particular one of the one or more end points and a system on the first network.

58. The system according to claim 54, wherein the control proxy element forwards, to a particular one of the one or more end points, an entire control state for communications between the particular one of the one or more end points and a system on the first network.

59. The system according to claim 54, wherein the first network comprises at least one of a small computer system interface (SCSI) network, a Fibre Channel (FC) network or a remote direct memory access (RDMA) network.

60. The system according to claim 54, wherein the proxy payload comprises at least one of SCSI information, FC information or RDMA information.

61. The system according to claim 54, wherein the frame header relates to the kernel driver in a particular one of the one or more end points.

62. The system according to claim 54, wherein the one or more end points comprise one or more server blades.

63. The system according to claim 54, wherein the control proxy element is disposed in a shared server blade, the shared server blade being coupled to the one or more end points.

64. The system according to claim 54, wherein the second network comprises a Gigabit Ethernet network.

65. The system according to claim 54, wherein the control proxy element and the one or more end points are part of a unified Ethernet-based network that is seen as a non-Ethernet-based entity by the first network.

66. A system, comprising:
an end point that is adapted to generate a first frame that comprises a second frame, a proxy association header and a frame header, the frame header relating to a control proxy element, the first and second frames corresponding to different layer-2 protocols;
a control proxy element coupled to the end point, the control proxy element being adapted to receive the generated first frame over a first network and being adapted to send the second frame over a second network; and
a switch communicatively disposed between the end point and the control proxy element,
wherein the control proxy element and the switch are separate components, and
wherein the end point comprises a kernel driver that configures the control proxy element and that provides a particular level of security from user level applications.

67. The system according to claim 66, wherein the end point is part of a unified infrastructure over Ethernet and the second network is external to the unified infrastructure.

68. The system according to claim 66, wherein the control proxy element maintains a portion of control state for communications between the end point and a system on the second network.

69. The system according to claim 66, wherein the control proxy element and the end point share a portion of control state for communications between the end point and a system on the second network.

70. The system according to claim 66, wherein the control proxy element forwards, to the end point, an entire control state for communications between the end point and a system on the second network.

71. The system according to claim 66, wherein the control proxy element removes the second frame from the first frame.

72. The system according to claim 66, wherein the second network comprises at least one of a small computer system interface (SCSI) network, a Fibre Channel (FC) network or a remote direct memory access (RDMA) network.

73. The system according to claim 66, wherein the frame header relates to a particular port of the control proxy element.

74. The system according to claim 66, wherein the end point comprises one or more server blades.

75. The system according to claim 66, wherein the control proxy element is disposed in a shared server blade.

76. The system according to claim 75, further comprising:
additional end points coupled to the shared server blade,
wherein the end point is also coupled to the shared server blade.

77. The system according to claim 66, wherein the end point and the control proxy element are part of a unified Ethernet-based network.

78. The system according to claim 77, wherein the unified Ethernet-based network is seen as a non-Ethernet-based entity by the second network.

79. The system according to claim 66, wherein the control proxy element is part of a network switch, the network switch providing an entry point and an exit point of the first network.

80. The system according to claim 79, wherein the network switch combines at least a local access network (LAN) switch and a storage-traffic switch.

* * * * *